(12) United States Patent
Takahashi et al.

(10) Patent No.: US 9,304,523 B2
(45) Date of Patent: Apr. 5, 2016

(54) POWER SUPPLY CIRCUIT AND METHOD FOR DRIVING THE SAME

(71) Applicant: Semiconductor Energy Laboratory Co., Ltd., Atsugi-shi, Kanagawa-ken (JP)

(72) Inventors: Kei Takahashi, Kanagawa (JP); Masaaki Hiroki, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 353 days.

(21) Appl. No.: 13/741,468

(22) Filed: Jan. 15, 2013

(65) Prior Publication Data

US 2013/0193874 A1    Aug. 1, 2013

(30) Foreign Application Priority Data

Jan. 30, 2012    (JP) ................. 2012-016769

(51) Int. Cl.
*H05B 37/02*    (2006.01)
*G05F 1/46*    (2006.01)
(Continued)

(52) U.S. Cl.
CPC ............... *G05F 1/468* (2013.01); *H02M 3/156* (2013.01); *H02M 7/00* (2013.01); *H05B 33/0815* (2013.01); *H05B 37/02* (2013.01); *Y02B 20/347* (2013.01)

(58) Field of Classification Search
CPC .......... H05B 33/0815; H05B 33/0824; H05B 33/0842; H05B 33/0845; H05B 37/02; H02M 1/4208; H02M 2001/4291; H02M 3/3356; H02M 1/08; H02M 3/156; H02M 7/009; Y02B 20/383; Y02B 20/126; Y02B 20/347; Y02B 70/1475

USPC ............ 315/186, 200 R, 247, 291, 307, 312, 315/278, 297; 363/126, 127, 21.04, 21.11; 323/271

See application file for complete search history.

(56) References Cited

U.S. PATENT DOCUMENTS 5,731,856 A    3/1998 Kim et al.
5,744,864 A    4/1998 Cillessen et al.
(Continued)

FOREIGN PATENT DOCUMENTS

EP    1737044 A    12/2006
EP    2226847 A    9/2010
(Continued)

OTHER PUBLICATIONS

Asakuma.N. et al., "Crystallization and Reduction of Sol-Gel-Derived Zinc Oxide Films by Irradiation with Ultraviolet Lamp", Journal of Sol-Gel Science and Technology, 2003, vol. 26, pp. 181-184.
(Continued)

*Primary Examiner* — Haissa Philogene
(74) *Attorney, Agent, or Firm* — Fish & Richardson P.C.

(57) ABSTRACT

A power supply circuit with high power efficiency is provided. Alternatively, a power supply circuit with high power efficiency that is suitable for driving a light-emitting device is provided. The power supply circuit can switch current control in which driving is controlled based on information on current flowing through a load and voltage control in which driving is controlled based on information on voltage applied to a load. In a period during which voltage control is performed, a current detector for detecting current flowing through the load is deactivated so that current does not flow through the current detector.

18 Claims, 10 Drawing Sheets

(51) Int. Cl.
  *H02M 7/00* (2006.01)
  *H05B 33/08* (2006.01)
  *H02M 3/156* (2006.01)

(56) References Cited

U.S. PATENT DOCUMENTS

| | | | |
|---|---|---|---|
| 6,294,274 | B1 | 9/2001 | Kawazoe et al. |
| 6,563,174 | B2 | 5/2003 | Kawasaki et al. |
| 6,727,522 | B1 | 4/2004 | Kawasaki et al. |
| 7,049,190 | B2 | 5/2006 | Takeda et al. |
| 7,061,014 | B2 | 6/2006 | Hosono et al. |
| 7,064,346 | B2 | 6/2006 | Kawasaki et al. |
| 7,105,868 | B2 | 9/2006 | Nause et al. |
| 7,211,825 | B2 | 5/2007 | Shih et al |
| 7,282,782 | B2 | 10/2007 | Hoffman et al. |
| 7,297,977 | B2 | 11/2007 | Hoffman et al. |
| 7,323,356 | B2 | 1/2008 | Hosono et al. |
| 7,385,224 | B2 | 6/2008 | Ishii et al. |
| 7,402,506 | B2 | 7/2008 | Levy et al. |
| 7,411,209 | B2 | 8/2008 | Endo et al. |
| 7,453,065 | B2 | 11/2008 | Saito et al. |
| 7,453,087 | B2 | 11/2008 | Iwasaki |
| 7,462,862 | B2 | 12/2008 | Hoffman et al. |
| 7,468,304 | B2 | 12/2008 | Kaji et al. |
| 7,501,293 | B2 | 3/2009 | Ito et al. |
| 7,548,436 | B1 * | 6/2009 | Chen .................. H02M 1/08 363/21.04 |
| 7,651,896 | B2 | 1/2010 | Honda et al. |
| 7,674,650 | B2 | 3/2010 | Akimoto et al. |
| 7,732,819 | B2 | 6/2010 | Akimoto et al. |
| 7,910,490 | B2 | 3/2011 | Akimoto et al. |
| 7,932,521 | B2 | 4/2011 | Akimoto et al. |
| 7,977,168 | B2 | 7/2011 | Honda et al. |
| 8,134,156 | B2 | 3/2012 | Akimoto |
| 8,158,464 | B2 | 4/2012 | Akimoto |
| 8,274,077 | B2 | 9/2012 | Akimoto et al. |
| 8,305,004 | B2 * | 11/2012 | Shao .......................... 315/247 |
| 8,670,248 | B2 * | 3/2014 | Yang .......................... 363/21.16 |
| 8,754,590 | B2 * | 6/2014 | Makino et al. ............. 315/307 |
| 8,860,317 | B2 * | 10/2014 | Park et al. .................. 315/165 |
| 2001/0046027 | A1 | 11/2001 | Tai et al. |
| 2002/0056838 | A1 | 5/2002 | Ogawa |
| 2002/0132454 | A1 | 9/2002 | Ohtsu et al. |
| 2003/0189401 | A1 | 10/2003 | Kido et al. |
| 2003/0218222 | A1 | 11/2003 | Wager, III et al. |
| 2004/0038446 | A1 | 2/2004 | Takeda et al. |
| 2004/0127038 | A1 | 7/2004 | Carcia et al. |
| 2005/0017302 | A1 | 1/2005 | Hoffman |
| 2005/0199959 | A1 | 9/2005 | Chiang et al. |
| 2006/0035452 | A1 | 2/2006 | Carcia et al. |
| 2006/0043377 | A1 | 3/2006 | Hoffman et al. |
| 2006/0091793 | A1 | 5/2006 | Baude et al. |
| 2006/0108529 | A1 | 5/2006 | Saito et al. |
| 2006/0108636 | A1 | 5/2006 | Sano et al. |
| 2006/0110867 | A1 | 5/2006 | Yabuta et al. |
| 2006/0113536 | A1 | 6/2006 | Kumomi et al. |
| 2006/0113539 | A1 | 6/2006 | Sano et al. |
| 2006/0113549 | A1 | 6/2006 | Den et al. |
| 2006/0113565 | A1 | 6/2006 | Abe et al. |
| 2006/0169973 | A1 | 8/2006 | Isa et al. |
| 2006/0170111 | A1 | 8/2006 | Isa et al. |
| 2006/0197092 | A1 | 9/2006 | Hoffman et al. |
| 2006/0208977 | A1 | 9/2006 | Kimura |
| 2006/0228974 | A1 | 10/2006 | Thelss et al. |
| 2006/0231882 | A1 | 10/2006 | Kim et al. |
| 2006/0238135 | A1 | 10/2006 | Kimura |
| 2006/0244107 | A1 | 11/2006 | Sugihara et al. |
| 2006/0284171 | A1 | 12/2006 | Levy et al. |
| 2006/0284172 | A1 | 12/2006 | Ishii |
| 2006/0292777 | A1 | 12/2006 | Dunbar |
| 2007/0024187 | A1 | 2/2007 | Shin et al. |
| 2007/0046191 | A1 | 3/2007 | Saito |
| 2007/0052025 | A1 | 3/2007 | Yabuta |
| 2007/0054507 | A1 | 3/2007 | Kaji et al. |
| 2007/0090365 | A1 | 4/2007 | Hayashi et al. |
| 2007/0108446 | A1 | 5/2007 | Akimoto |
| 2007/0152217 | A1 | 7/2007 | Lai et al. |
| 2007/0172591 | A1 | 7/2007 | Seo et al. |
| 2007/0187678 | A1 | 8/2007 | Hirao et al. |
| 2007/0187760 | A1 | 8/2007 | Furuta et al. |
| 2007/0194379 | A1 | 8/2007 | Hosono et al. |
| 2007/0252928 | A1 | 11/2007 | Ito et al. |
| 2007/0272922 | A1 | 11/2007 | Kim et al. |
| 2007/0287296 | A1 | 12/2007 | Chang |
| 2008/0006877 | A1 | 1/2008 | Mardilovich et al. |
| 2008/0038882 | A1 | 2/2008 | Takechi et al. |
| 2008/0038929 | A1 | 2/2008 | Chang |
| 2008/0050595 | A1 | 2/2008 | Nakagawara et al. |
| 2008/0073653 | A1 | 3/2008 | Iwasaki |
| 2008/0083950 | A1 | 4/2008 | Pan et al. |
| 2008/0106191 | A1 | 5/2008 | Kawase |
| 2008/0128689 | A1 | 6/2008 | Lee et al. |
| 2008/0129195 | A1 | 6/2008 | Ishizaki et al. |
| 2008/0166834 | A1 | 7/2008 | Kim et al. |
| 2008/0182358 | A1 | 7/2008 | Cowdery-Corvan et al. |
| 2008/0224133 | A1 | 9/2008 | Park et al. |
| 2008/0254569 | A1 | 10/2008 | Hoffman et al. |
| 2008/0258139 | A1 | 10/2008 | Ito et al. |
| 2008/0258140 | A1 | 10/2008 | Lee et al. |
| 2008/0258141 | A1 | 10/2008 | Park et al. |
| 2008/0258143 | A1 | 10/2008 | Kim et al. |
| 2008/0296568 | A1 | 12/2008 | Ryu et al. |
| 2008/0308796 | A1 | 12/2008 | Akimoto et al. |
| 2008/0308805 | A1 | 12/2008 | Akimoto et al. |
| 2009/0008639 | A1 | 1/2009 | Akimoto et al. |
| 2009/0068773 | A1 | 3/2009 | Lai et al. |
| 2009/0073325 | A1 | 3/2009 | Kuwabara et al. |
| 2009/0114910 | A1 | 5/2009 | Chang |
| 2009/0134399 | A1 | 5/2009 | Sakakura et al. |
| 2009/0152506 | A1 | 6/2009 | Umeda et al. |
| 2009/0152541 | A1 | 6/2009 | Maekawa et al. |
| 2009/0189155 | A1 | 7/2009 | Akimoto |
| 2009/0189156 | A1 | 7/2009 | Akimoto |
| 2009/0278122 | A1 | 11/2009 | Hosono et al. |
| 2009/0280600 | A1 | 11/2009 | Hosono et al. |
| 2009/0305461 | A1 | 12/2009 | Akimoto et al. |
| 2010/0003783 | A1 | 1/2010 | Akimoto |
| 2010/0038639 | A1 | 2/2010 | Akimoto |
| 2010/0065844 | A1 | 3/2010 | Tokunaga |
| 2010/0092800 | A1 | 4/2010 | Itagaki et al. |
| 2010/0109002 | A1 | 5/2010 | Itagaki et al. |
| 2010/0109537 | A1 | 5/2010 | Nishino et al. |
| 2010/0136743 | A1 | 6/2010 | Akimoto et al. |
| 2011/0104851 | A1 | 5/2011 | Akimoto et al. |
| 2011/0117697 | A1 | 5/2011 | Akimoto et al. |
| 2011/0121290 | A1 | 5/2011 | Akimoto et al. |
| 2011/0133706 | A1 | 6/2011 | Takahashi et al. |
| 2011/0163311 | A1 | 7/2011 | Akimoto et al. |
| 2011/0260160 | A1 | 10/2011 | Honda et al. |
| 2011/0304311 | A1 | 12/2011 | Takahashi et al. |
| 2012/0140523 | A1 | 6/2012 | Takahashi et al. |
| 2015/0077030 | A1 * | 3/2015 | Soh .......................... H02P 27/08 318/504 |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |

(56) References Cited

FOREIGN PATENT DOCUMENTS

| JP | 2004-273732 A | 9/2004 |
|---|---|---|
| JP | 2008-130989 A | 6/2008 |
| WO | WO-2004/114391 | 12/2004 |
| WO | 2008/050679 A1 | 5/2008 |

OTHER PUBLICATIONS

Asaoka.Y et al., "29.1:Polarizer-Free Reflective LCD Combined With Ultra Low-Power Driving Technology", SID Digest '09 : SID International Symposium Digest of Technical Papers, May 31, 2009, pp. 395-398.

Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.

Cho.D et al., "21.2:Al and Sn-Doped Zinc Indium Oxide Thin Film Transistors for AMOLED Back Plane", SID Digest '09 : SID International Symposium Digest of Technical Papers, May 31, 2009, pp. 280-283.

Clark.S et al., "First Principles Methods Using CASTEP", Zeitschrift fur Kristallographie, 2005, vol. 220, pp. 567-570.

Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.

Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

Fortunato.E et al., "Wide-Bandgap High-Mobility ZnO Thin-Film Transistors Produced At Room Temperature", Appl. Phys. Lett. (Applied Physics Letters) , Sep. 27, 2004, vol. 85, No. 13, pp. 2541-2543.

Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.

Godo.H et al., "P-9:Numerical Analysis on Temperature Dependence of Characteristics of Amorphous In—Ga—Zn—Oxide TFT", SID Digest '09 : SID International Symposium Digest of Technical Papers, May 31, 2009, pp. 1110-1112.

Godo.H et al., "Temperature Dependence of Characteristics and Electronic Structure for Amorphous In—Ga—Zn—Oxide TFT", AM-FPD '09 Digest of Technical Papers, Jul. 1, 2009, pp. 41-44.

Hayashi.R et al., "42.1: Invited Paper: Improved Amorphous In—Ga—Zn—O TFTs", SID Digest '08 : SID International Symposium Digest of Technical Papers, May 20, 2008, vol. 39, pp. 621-624.

Hirao.T et al., "Novel Top-Gate Zinc Oxide Thin-Film Transistors (ZnO TFTs) for AMLCDS", J. Soc. Inf. Display (Journal of the Society for Information Display), 2007, vol. 15, No. 1, pp. 17-22.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.

Hsieh.H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.

Ikeda.T et al., "Full-Functional System Liquid Crystal Display Using CG-Silicon Technology", SID Digest '04 : SID International Symposium Digest of Technical Papers, 2004, vol. 35, pp. 860-863.

Janotti.A et al., "Native Point Defects in ZnO", Phys. Rev. B (Physical Review. B), Oct. 4, 2007, vol. 76, No. 16, pp. 165202-1-165202-22.

Janotti.A et al., "Oxygen Vacancies in ZnO", Appl. Phys. Lett. (Applied Physics Letters) , 2005, vol. 87, pp. 122102-1-122102-3.

Jeong.J et al., "3.1: Distinguished Paper: 12.1-Inch WXGA AMOLED Display Driven by Indium—Gallium—Zinc Oxide TFTs Array", SID Digest '08 : SID International Symposium Digest of Technical Papers, May 20, 2008, vol. 39, No. 1, pp. 1-4.

Jin.D et al., "65.2:Distinguished Paper:World-Largest (6.5") Flexible Full Color Top Emission AMOLED Display on Plastic Film and its Bending Properties", SID Digest '09 : SID International Symposium Digest of Technical Papers, May 31, 2009, pp. 983-985.

Kanno.H et al., "White Stacked Electrophosphorecent Organic Light-Emitting Devices Employing MoO3 as a Charge-Generation Layer", Adv. Mater. (Advanced Materials), 2006, vol. 18, No. 3, pp. 339-342.

Kikuchi.H et al., "39.1:Invited Paper:Optically Isotropic Nano-Structured Liquid Crystal Composites for Display Applications", SID Digest '09 : SID International Symposium Digest of Technical Papers, May 31, 2009, pp. 578-581.

Kikuchi.H et al., "62.2:Invited Paper:Fast Electro-Optical Switching in Polymer-Stabilized Liquid Crystalline Blue Phases for Display Application", SID Digest '07 : SID International Symposium Digest of Technical Papers, 2007, vol. 38, pp. 1737-1740.

Kikuchi.H et al., "Polymer-Stabilized Liquid Crystal Blue Phases", Nature Materials, Sep. 2, 2002, vol. 1, pp. 64-68.

Kim.S et al., "High-Performance oxide thin film transistors passivated by various gas plasmas", 214th ECS Meeting, 2008, No. 2317, ECS.

Kimizuka.N. et al., "Spinel,YbFe2O4, and Yb2Fe3O7 Types of Structures for Compounds in the In2O3 and Sc2O3—A2O3—BO Systems [A; Fe, Ga, or Al; B: Mg, Mn, Fe, Ni, Cu,or Zn] at Temperatures over 1000° C.", Journal of Solid State Chemistry, 1985, vol. 60, pp. 382-384.

Kimizuka.N. et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System", Journal of Solid State Chemistry, Apr. 1, 1995, vol. 116, No. 1, pp. 170-178.

Kitzerow.H et al., "Observation of Blue Phases in Chiral Networks", Liquid Crystals, 1993, vol. 14, No. 3, pp. 911-916.

Kurokawa.Y et al., "UHF RFCPUS on Flexible and Glass Substrates for Secure RFID Systems", Journal of Solid-State Circuits, 2008, vol. 43, No. 1, pp. 292-299.

Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.

Lee.H et al., "Current Status of, Challenges to, and Perspective View of AM-OLED", IDW '06 :Proceedings of the 13th International Display Workshops, Dec. 7, 2006, pp. 663-666.

Lee.J et al., "World's Largest (15-Inch) XGA AMLCD Panel Using IGZO Oxide TFT", SID Digest '08 : SID International Symposium Digest of Technical Papers, May 20, 2008, vol. 39, pp. 625-628.

Lee.M et al., "15.4:Excellent Performance of Indium-Oxide-Based Thin-Film Transistors by DC Sputtering", SID Digest '09 : SID International Symposium Digest of Technical Papers, May 31, 2009, pp. 191-193.

Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.

Masuda.S et al., "Transparent thin film transistors using ZnO as an active channel layer and their electrical properties", J. Appl. Phys. (Journal of Applied Physics) , Feb. 1, 2003, vol. 93, No. 3, pp. 1624-1630.

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Miyasaka.M, "SUFTLA Flexible Microelectronics on Their Way to Business", SID Digest '07 : SID International Symposium Digest of Technical Papers, 2007, vol. 38, pp. 1673-1676.

Mo.Y et al., "Amorphous Oxide TFT Backplanes for Large Size AMOLED Displays", IDW '08 : Proceedings of the 6th International Display Workshops, Dec. 3, 2008, pp. 581-584.

(56) References Cited

OTHER PUBLICATIONS

Nakamura.M et al., "The phase relations in the In2O3—Ga2ZnO4—ZnO system at 1350° C.", Journal of Solid State Chemistry, Aug. 1, 1991, vol. 93, No. 2, pp. 298-315.

Nakamura.M, "Synthesis of Homologous Compound with New Long-Period Structure", Nirim Newsletter, Mar. 1, 1995, vol. 150, pp. 1-4.

Nomura.K et al., "Amorphous Oxide Semiconductors for High-Performance Flexible Thin-Film Transistors", Jpn. J. Appl. Phys. (Japanese Journal of Applied Physics), 2006, vol. 45, No. 5B, pp. 4303-4308.

Nomura.K et al., "Carrier transport in transparent oxide semiconductor with intrinsic structural randomness probed using single-crystalline InGaO3(ZnO)5 films", Appl. Phys. Lett. (Applied Physics Letters), Sep. 13, 2004, vol. 85, No. 11, pp. 1993-1995.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Nomura.K et al., "Thin-Film Transistor Fabricated in Single-Crystalline Transparent Oxide Semiconductor", Science, May 23, 2003, vol. 300, No. 5623, pp. 1269-1272.

Nowatari.H et al., "60.2: Intermediate Connector With Suppressed Voltage Loss for White Tandem OLEDs", SID Digest '09 : SID International Symposium of Technical Papers, May 31, 2009, vol. 40, pp. 899-902.

Oba.F et al., "Defect energetics in ZnO: A hybrid Hartree-Fock density functional study", Phys. Rev. B (Physical Review. B), 2008, vol. 77, pp. 245202-1-245202-6.

Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.

Ohara.H et al., "21.3:4.0 In. QVGA AMOLED Display Using In—Ga—Zn—Oxide TFTs With a Novel Passivation Layer", SID Digest '09 : SID International Symposium Digest of Technical Papers, May 31, 2009, pp. 284-287.

Ohara.H et al., "Amorphous In—Ga—Zn—Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.

Orita.M et al., "Amorphous transparent conductive oxide InGaO3(ZnO)m (m<4):a Zn4s conductor", Philosophical Magazine, 2001, vol. 81, No. 5, pp. 501-515.

Orita.M et al., "Mechanism of Electrical Conductivity of Transparent InGaZnO4", Phys. Rev. B (Physical Review.B), Jan. 15, 2000, vol. 61, No. 3, pp. 1811-1816.

Osada.T et al., "15.2: Development of Driver-Integrated Panel using Amorphous In—Ga—Zn—Oxide TFT", SID Digest '09 : SID International Symposium of Technical Papers, May 31, 2009, pp. 184-187.

Osada.T et al., "Development of Driver-Integrated Panel Using Amorphous In—Ga—Zn—Oxide TFT", AM-FPD '09 Digest of Technical Papers, Jul. 1, 2009, pp. 33-36.

Park.J et al., "Amorphous Indium—Gallium—Zinc Oxide TFTs and Their Application for Large Size AMOLED". AM-FPD '08 Digest of Technical Papers, Jul. 2, 2008, pp. 275-278.

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.

Park.J et al., "Electronic Transport Properties of Amorphous Indium—Gallium—Zinc Oxide Semiconductor Upon Exposure to Water", Appl. Phys. Lett. (Applied Physics Letters), 2008, vol. 92, pp. 072104-1-072104-3.

Park.J et al., "High performance amorphous oxide thin film transistors with self-aligned top-gate structure", IEDM 09: Technical Digest of International Electron Devices Meeting, Dec. 7, 2009, pp. 191-194.

Park.J et al., "Improvements in the Device Characteristics of Amorphous Indium Gallium Zinc Oxide Thin-Film Transistors by Ar Plasma Treatment", Appl. Phys. Lett. (Applied Physics Letters), Jun. 26, 2007, vol. 90, No. 26, pp. 262106-1-262106-3.

Park.S et al., "Challenge to Future Displays: Transparent AM-OLED Driven by Peald Grown ZnO TFT", IMID '07 Digest, 2007, pp. 1249-1252.

Park.Sang-Hee et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.

Prins.M et al., "A Ferroelectric Transparent Thin-Film Transistor", Appl. Phys. Lett. (Applied Physics Letters), Jun. 17, 1996, vol. 68, No. 25, pp. 3650-3652.

Sakata.J et al., "Development of 4.0-In. AMOLED Display With Driver Circuit Using Amorphous In—Ga—Zn—Oxide TFTs", IDW '09 : Proceedings of the 16th International Display Workshops, 2009, pp. 689-692.

Son.K et al., "42.4L: Late-News Paper: 4 Inch QVGA AMOLED Driven by the Threshold Voltage Controlled Amorphous GIZO (Ga2O3—In2O3—ZnO) TFT", SID Digest '08 : SID International Symposium Digest of Technical Papers, May 20, 2008, vol. 39, pp. 633-636.

Takahashi.M et al., "Theoretical Analysis of IGZO Transparent Amorphous Oxide Semiconductor", IDW '08 : Proceedings of the 15th International Display Workshops, Dec. 3, 2008, pp. 1637-1640.

Tsuda.K et al., "Ultra Low Power Consumption Technologies for Mobile TFT-LCDs", IDW '02 : Proceedings of the 9th International Display Workshops, Dec. 4, 2002, pp. 295-298.

Ueno.K et al., "Field-Effect Transistor on SrTiO3 With Sputtered Al2O3 Gate Insulator", Appl. Phys. Lett. (Applied Physics Letters), Sep. 1, 2003, vol. 83, No. 9, pp. 1755-1757.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

\* cited by examiner

POWER SUPPLY CIRCUIT AND METHOD FOR DRIVING THE SAME

BACKGROUND OF THE INVENTION

1. Field of the Invention

The present invention relates to semiconductor devices. In particular, the present invention relates to power supply circuits and methods for driving the power supply circuits.

Note that in this specification, a semiconductor device generally means a device which can function by utilizing semiconductor characteristics. An electrooptic device, a display device (including a light-emitting display device), a semiconductor circuit, and an electronic device are all semiconductor devices.

2. Description of the Related Art

A direct current-to-direct current (DC-DC) converter is known as one of power supply circuits that change output power depending on variations in circuit loads to output stable power.

DC-DC converters are often used in power supply circuits that supply stable power to light-emitting devices including light-emitting diode (LED) elements, organic electroluminescence (EL) elements, or the like. DC-DC converters are adapted to a variety of other uses. For example, DC-DC converters are used in control circuits for controlling charging and discharging of electric storage devices or power supply circuits for supplying power to drive motors.

Patent Document 1 discloses a lighting apparatus including a DC-DC converter and an LED element.

For example, the emission luminance of a current drive light-emitting element such as an LED element or an organic EL element changes depending on current flowing through the element. Thus, in the case where a DC-DC converter is used in a light-emitting device including such a light-emitting element, current flowing through the element is controlled to be always constant in order to stabilize emission luminance.

FIG. 10 illustrates a structure example of a conventional DC-DC converter.

The DC-DC converter in FIG. 10 is a step-down DC-DC converter outputting voltage that is lower than input voltage. In FIG. 10, the DC-DC converter includes two switches (a switch 12 and a switch 13) connected in series, a controller 11 controlling the operation of each switch, a coil 14, a current detection resistor 15, a capacitor 16, and a load 17.

Here, the current detection resistor 15 is provided to detect the value of current flowing through the load 17. As illustrated in FIG. 10, by connecting the current detection resistor 15 in series with the load 17, it is possible to measure current flowing through the load 17 from a potential difference (voltage) across the current detection resistor 15.

Voltage applied to the current detection resistor 15 is input to the controller 11, and the operation of the two switches is controlled so that the voltage is at a desired value, that is, current flowing through the load 17 is constant. Thus, stable power can be output.

In this manner, conventional DC-DC converters often employ a method for detecting and controlling current flowing through a load (hereinafter also referred to as a current control method).

REFERENCE

Patent Document 1: Japanese Published Patent Application No. 2008-130989

SUMMARY OF THE INVENTION

A conventional current control driving method has a problem in that power loss is caused by a current detection resistor because current constantly flows through the current detection resistor connected in series with a load.

As a method for reducing this power loss, there is a method for reducing the resistance of a current detection resistor connected in series with a load. However, when the resistance is low, a signal to be detected is weak; thus, high accuracy is needed.

For example, it is difficult for a detection circuit manufactured in a common CMOS process to detect a weak signal. A detection circuit manufactured in a bipolar process has high accuracy. However, the manufacturing cost of the bipolar process is higher than that of the CMOS process, which is impractical.

The present invention is made in view of the technical background. Thus, it is an object of one embodiment of the present invention to provide a power supply circuit with high power efficiency. It is an object of one embodiment of the present invention to provide a power supply circuit with high power efficiency that is suitable for driving a light-emitting device including a light-emitting element.

The present invention achieves at least one of the objects.

In order to achieve the object, the present invention focuses on time-division switching for control of a DC-DC converter. A power supply circuit can switch current control in which driving is controlled based on information on current flowing through a load (also referred to as current data) and voltage control in which driving is controlled based on information on voltage applied to a load (also referred to as voltage data). In a period during which voltage control is performed, a current detector for detecting current flowing through the load is deactivated so that current does not flow through the current detector. Here, in this specification and the like, deactivation of part of a circuit means non-driving of part of the circuit, electrical disconnection of part of the circuit, or stop of supply of power, voltage, or current to part of the circuit.

A power supply circuit according to one embodiment of the present invention includes a power converter for converting input power from a power source into output power and supplying the output power to a load, a controller for controlling the operation of the power converter, a current detector for detecting current flowing through the load and outputting current data to the controller, and a voltage detector for detecting voltage applied to the load and outputting voltage data to the controller. A control signal for switching a current control period and a voltage control period is input to the power supply circuit. In the current control period, the controller controls the operation of the power converter based on the current data. In the voltage control period, the controller controls the operation of the power converter based on the voltage data, and the current detector is deactivated by the control signal.

With such a structure, the current detector for detecting current flowing through the load is deactivated in the voltage control period; thus, power loss in the current detector in this period can be eliminated. When voltage control and current control can be performed and the voltage control period and the current control period can be switched in this manner, the conversion efficiency of the power supply circuit can be increased.

A power supply circuit according to another embodiment of the present invention includes a power converter for converting input power from a power source into output power and supplying the output power to a load, a controller for controlling the operation of the power converter, a current detector for detecting current flowing through the load and outputting current data to the controller, and a voltage detector for detecting voltage applied to the load and outputting voltage data to the controller. A control signal for switching a current control period and a voltage control period is input to the power supply circuit. In the current control period, the controller controls the operation of the power converter based on the current data and acquires the voltage data as first data. In the voltage control period, the controller controls the operation of the power converter based on the result of a comparison between the first data acquired in the current control period and the voltage data output from the voltage detector, and the current detector is deactivated by the control signal.

The power supply circuit with such a structure is particularly effective in the case where an element that is sensitive to a variation in current or voltage or an element whose resistance varies is used as the load.

For example, in a light-emitting device including a light-emitting element such as an LED element or an organic EL element, a slight variation in voltage or current influences the emission luminance of the element. In addition, the resistance of such a light-emitting element varies in some cases due to an external factor such as temperature. In such a case, voltage needed for supplying constant current varies depending on the variation in resistance.

With the above structure, in the voltage control period, the controller can control the operation of the power converter based on the voltage data acquired in the current control period. In addition, the voltage data can be always updated by repeating the current control period and the voltage control period alternately, and control can be performed so that the current value is always constant even when the size of the load varies. Thus, the power supply circuit can be driven stably with high conversion efficiency.

Further, in the power supply circuit, it is preferable that the controller include a converter for converting voltage data into a digital signal and a storage device to which the digital signal is input, acquire voltage data output from the voltage detector as first data in the current control period, retain the voltage data in the storage device, and that compare the voltage data to the first data in the voltage control period.

With such a structure, voltage data acquired in the current control period can be retained in the storage device; thus, in the voltage control period, driving can be controlled based on the data retained in the storage device. In this case, the current control period is an extremely short period needed for acquisition of voltage data, so that the voltage control period can be much longer than the current control period. Consequently, the power supply circuit can have higher conversion efficiency.

The storage device can be a data rewritable storage device. For example, it is possible to use a volatile storage device such as a dynamic random access memory (DRAM) or a static random access memory (SRAM), or a nonvolatile storage device such as a magnetoresistive random access memory (MRAM), a resistance random access memory (ReRAM), a phase change random access memory (PRAM), or a flash memory. Here, it is preferable to use an SRAM that can be formed in a CMOS process as the storage device because the SRAM can be formed in the same process as another element included in the controller.

In the power supply circuit, it is preferable that the controller include a storage capacitor for holding the potential of the voltage data and a first switch between the voltage detector and the storage capacitor, acquire the potential of the voltage data by turning on the first switch in the current control period, hold the potential of the voltage data in the storage capacitor by turning off the first switch, and that compare the voltage data to the first data in the voltage control period.

With such a structure, the circuit structure can be simplified because only a storage capacitor and a switch need to be added in order to acquire voltage data.

The first switch is preferably a transistor including an oxide semiconductor in a semiconductor layer where a channel is formed.

An oxide semiconductor has a high energy gap of 3.0 eV or more. A transistor including an oxide semiconductor layer obtained by processing of an oxide semiconductor in an appropriate condition and a sufficient reduction in carrier density of the oxide semiconductor can have much lower leakage current between a source and a drain in an off state (off-state current) than a conventional transistor including silicon.

By using a transistor with low off-state current as the switch connected to the storage capacitor, a decrease in potential held in the storage capacitor can be significantly suppressed.

Thus, a holding period can be extremely long without an increase in capacitance of the storage capacitor and the voltage control period can be long. Alternatively, the capacitance of the storage capacitor can be decreased, so that a charging period of the storage capacitor and the current control period can be short. In either case, the voltage control period can be relatively long, so that power efficiency can be further increased.

In any of the power supply circuits, it is preferable that the current detector include a current detection resistor connected in series with the load and a second switch connected in parallel with the current detection resistor, and that the current detector is deactivated by turning off the second switch in the current control period and turning on the second switch in the voltage control period.

With such a structure, the current detection resistor is short-circuited by turning on the second switch in the voltage control period, so that the current detector can be deactivated certainly. Further, the circuit structure can be simplified because only a switch needs to be added in order to fulfill such a function.

It is preferable that one end of the current detection resistor be connected to the load and that the other end of the current detection resistor be grounded.

By providing the current detection resistor in the current detector on a reference potential side (also referred to as a low side or a low potential side) compared to the load in this manner, a low potential can be an output potential from the current detector. Thus, it is not necessary to provide an element with high breakdown voltage additionally as an element on an input side of the controller to which the output potential is input, and it is possible to form the controller with the use of an element manufactured in a conventional CMOS process. Consequently, manufacturing costs can be reduced.

A method for driving a power supply circuit according to one embodiment of the present invention includes a step of converting power input to a power converter controlled by a controller into output power by the power converter and a step of supplying the output power from the power converter to the load. The driving method has a current control period and a voltage control period. In the current control period, the driving method includes a step of detecting current flowing through the load by a current detector, a step of outputting current data from the current detector to the controller, and a step of controlling the operation of the power converter by the controller based on the current data. In the voltage control period, the driving method includes a step of deactivating the current detector, a step of detecting voltage applied to the load by a voltage detector, a step of outputting voltage data from the voltage detector to the controller, and a step of controlling the operation of the power converter by the controller based on the voltage data. The driving method further includes a step of switching the current control period and the voltage control period alternately.

With such a method, power loss caused by the current detector can be reduced, and a power supply circuit with high power efficiency can be obtained.

A method for driving a power supply circuit according to another embodiment of the present invention includes a step of converting power input to a power converter controlled by a controller into output power by the power converter and a step of supplying the output power from the power converter to the load. The driving method has a current control period and a voltage control period. In the current control period, the driving method includes a step of detecting current flowing through the load by a current detector, a step of outputting current data from the current detector to the controller, a step of detecting voltage applied to the load by a voltage detector, a step of outputting voltage data from the voltage detector to the controller, a step of controlling the operation of the power converter by the controller based on the current data, and a step of acquiring the voltage data as first data by the controller. In the voltage control period, the driving method includes a step of deactivating the current detector, a step of detecting voltage applied to the load by the voltage detector, a step of outputting the voltage data from the voltage detector to the controller, and a step of controlling the operation of the power converter by the controller based on the result of a comparison between the first data acquired in the current control period and the voltage data output from the voltage detector. The driving method further includes a step of switching the current control period and the voltage control period alternately.

With such a method, it is possible to obtain a power supply circuit with high power efficiency that is suitable for a light-emitting device including a light-emitting element sensitive to a current value.

In the method for driving a power supply circuit, the voltage control period is preferably set relatively long compared to the current control period. As the voltage control period is relatively long, power loss in the current detector can be reduced, and power efficiency can be increased.

For example, the voltage control period can be $10^2$ or more times, preferably $10^3$ or more times as long as the current control period. Further, when the transistor that has an oxide semiconductor and extremely low off-state current is used, the voltage control period can be $10^5$ or more times, preferably $10^6$ or more times as long as the current control period.

According to the present invention, it is possible to provide a power supply circuit with high power efficiency. Further, it is possible to provide a power supply circuit with high power efficiency that is suitable for driving a light-emitting device including a light-emitting element.

DETAILED DESCRIPTION OF THE INVENTION

Figure 1:
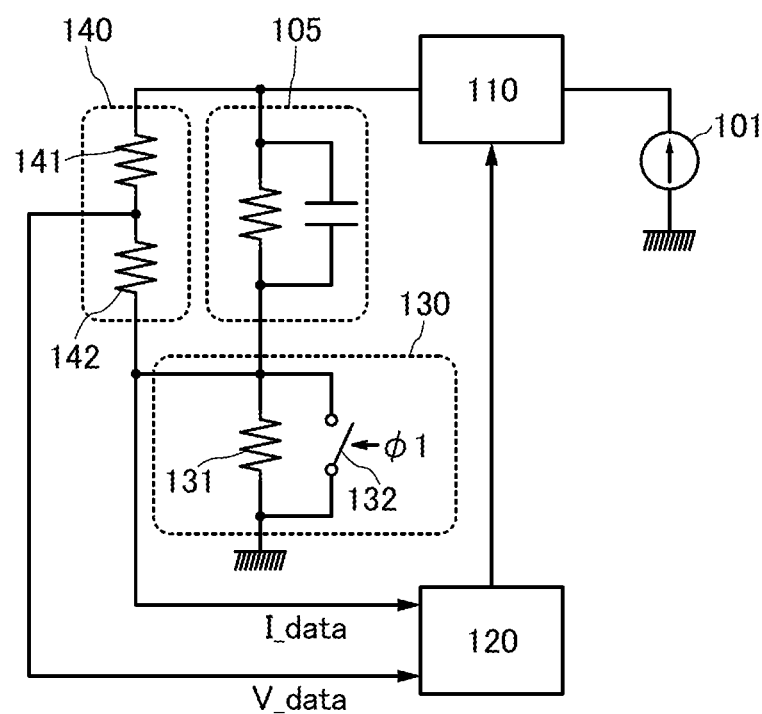
FIG. 1 illustrates a structure example of a power supply circuit according to one embodiment of the present invention.

Embodiments will be described in detail with reference to the drawings. Note that the present invention is not limited to the following description. It will be readily appreciated by those skilled in the art that modes and details of the present invention can be modified in various ways without departing from the spirit and scope of the present invention. The present invention therefore should not be construed as being limited to the following description of the embodiments. Note that in structures of the present invention described below, the same portions or portions having similar functions are denoted by the same reference numerals in different drawings, and a description thereof is not repeated.

Note that in each drawing described in this specification, the size, layer thickness, or region of each component is exaggerated for clarity in some cases. Thus, the scale of each component is not necessarily limited to that illustrated in the drawing.

A transistor is a kind of semiconductor elements and can perform amplification of current or voltage, switching operation for controlling conduction or non-conduction, or the like. A transistor in this specification also means an insulated-gate field-effect transistor (IGFET) and a thin film transistor (TFT).

The functions of a "source" and a "drain" might interchange when a transistor of opposite polarity is used or the direction of current flow is changed in circuit operation, for example. Thus, in this specification, the terms "source" and "drain" can interchange.

In this specification and the like, one of a source and a drain of a transistor is referred to as a "first electrode" and the other of the source and the drain of the transistor is referred to as a "second electrode" in some cases.

In this specification and the like, two terminals of a two-terminal element such as a coil, a resistor, or a capacitor are referred to as a "first terminal" and a "second terminal" in some cases. In addition, one of the terminals is simply referred to as "one end" in some cases.

In this specification and the like, an expression "electrically connected" means that components are connected to each other through an object having any electric action. Here, there is no particular limitation on an object having any electric action as long as electric signals can be transmitted and received between components that are connected to each other. Examples of an object having any electric action include an electrode, a wiring, a switching element such as a transistor, a resistor, a coil, a capacitor, and an element with a variety of functions.

Note that in this specification and the like, a node is an element (e.g., a wiring) which enables electrical connection between elements included in a circuit. Thus, a "node to which A is connected" is a wiring which is electrically connected to A and can be regarded as having the same potential as A. Even when one or more elements which enable electrical connection (e.g., switches, transistors, capacitors, inductors, resistors, or diodes) are in a portion of the wiring, the wiring can be regarded as the "node to which A is connected" as long as it has the same potential as A.

In this specification and the like, an expression "grounded" means that a ground potential is applied. In addition, a "ground potential" in this specification and the like means a reference potential or a common potential.

(Embodiment 1)

In this embodiment, a power supply circuit according to one embodiment of the present invention and a method for driving the power supply circuit are described with reference to drawings.

STRUCTURE EXAMPLE

FIG. 1 illustrates a structure example of a power supply circuit to which a load 105 is connected.

The power supply circuit in FIG. 1 includes a power converter 110, a controller 120, a current detector 130, and a voltage detector 140.

A direct current (DC) power source 101 is electrically connected to the power converter 110, and direct current (DC) power is input from the DC power source 101 to the power converter 110. The power converter 110 converts DC power input from the DC power source 101 into DC power output to the load 105.

The power converter 110 can be a known switching converter including a switching element. For example, the power converter 110 can be any of a variety of switching converters such as a step-down converter, a step-up converter, and a step-up/down converter.

The current detector 130 detects the value of current flowing through the load 105 and outputs current data based on the current value to the controller 120. Specifically, the current detector 130 outputs a potential based on the value of current flowing through the load 105 to the controller 120. Note that in this specification and the like, a potential output from the current detector 130 based on the value of current flowing through the load 105 is referred to as current data in some cases.

The current detector 130 includes at least a current detection resistor 131 and a switch 132. A first terminal of the current detection resistor 131 is electrically connected to the load 105, and a second terminal of the current detection resistor 131 is grounded. The switch 132 is connected in parallel with the current detection resistor 131, and the on state and off state of the switch 132 are controlled by a control signal φ1.

The potential of a node between the current detection resistor 131 and the load 105 is output to the controller 120 as current data.

Here, the resistance of the current detection resistor 131 is preferably as low as possible, in the range of the value of voltage applied to the current detection resistor 131 that can be detected by the controller 120. The optimum resistance of the current detection resistor 131 varies depending on the resistance of the load 105 connected to the power supply circuit or the value of voltage that can be detected by the controller 120. For example, the resistance of the current detection resistor 131 is set so that voltage applied to the current detection resistor 131 is 0.5 to 2.0 V, preferably 0.6 to 1.2 V. As the resistance of the current detection resistor 131 becomes low, power loss caused in a current control period to be described later can be reduced.

The switch 132 is a switching element having much lower on resistance than the current detection resistor 131. For example, the switch 132 is a switching element having on resistance $1/10^2$ or lower, preferably $1/10^3$ or lower than the current detection resistor 131.

The current detection resistor 131 in the current detector 130 is short-circuited by turning on the switch 132 in the voltage control period to be described later, so that the current detector 130 can be deactivated certainly. Further, the circuit structure can be simplified because only a switch needs to be added in order to fulfill such a function.

By providing the current detection resistor 131 in the current detector 130 on a reference potential side (also referred to as a low potential side or a low side) compared to the load 105 in this manner, a low potential can be an output potential from the current detector 130. Thus, it is not necessary to provide an element with high breakdown voltage additionally as an element on an input side of the controller 120 to which the output potential is input, and it is possible to form the controller 120 with the use of an element manufactured in a conventional CMOS process. Consequently, manufacturing costs can be reduced.

The voltage detector 140 detects the value of voltage applied to the load 105 and outputs voltage data based on the voltage value to the controller 120. Specifically, the voltage detector 140 outputs a potential based on the value of voltage applied to the load 105 to the controller 120. Note that in this specification and the like, a potential output from the voltage detector 140 based on the value of voltage applied to the load 105 is referred to as voltage data in some cases.

The voltage detector 140 includes at least two resistors (a resistor 141 and a resistor 142) connected in series. The resistor 141 and the resistor 142 are connected in parallel with the load 105. A first terminal of the resistor 141 is electrically connected to an output portion of the power converter 110. A second terminal of the resistor 141 is electrically connected to the first terminal of the current detection resistor 131 in the current detector 130.

Here, a potential between the resistor 141 and the resistor 142 is output to the controller 120 as the voltage data.

Note that the resistor in the voltage detector 140 is a resistor whose resistance is much higher than the resistance of the load 105. For example, the resistor in the voltage detector 140 is a resistor whose resistance is $10^3$ or more times, preferably $10^4$ or more times the maximum resistance of the load 105.

The controller 120 controls driving of the power converter 110 based on current data input from the current detector 130 or voltage data input from the voltage detector 140.

As a method for controlling the power converter 110, the controller 120 can employ a known control method such as pulse width modulation (PWM) or pulse frequency modulation (PFM).

Next, the operation of the power supply circuit is described.

The power supply circuit is operated by switching a current control period and a voltage control period alternately.

The current control period is a period during which the controller 120 controls the operation of the power converter 110 based on the value of current flowing through the load 105. On the other hand, the voltage control period is a period during which the controller 120 controls the operation of the power converter 110 based on the value of voltage applied to the load 105.

In the current control period, a signal for turning off the switch 132 is input as the control signal φ1. Thus, most of the current flowing through the load 105 flows through the current detection resistor 131. A potential between the current detection resistor 131 and the load 105 is input to the controller 120 as the current data.

At this time, the potential between the resistor 141 and the resistor 142 may be input from the voltage detector 140 to the controller 120 as the voltage data.

The controller 120 controls the operation of the power converter 110 based on the current data input. Specifically, the controller 120 controls the operation of the power converter 110 so that the value of the current data input approaches a predetermined potential.

Note that in the current control period, the controller 120 may control the operation of the power converter 110 based on two pieces of data: current data input and voltage data input.

On the other hand, in the voltage control period, a signal for turning on the switch 132 is input as the control signal φ1. Thus, ends of the current detection resistor 131 are short-circuited, and current hardly flows through the current detection resistor 131. At this time, a ground potential is input to the controller 120 as the current data.

The potential between the resistor 141 and the resistor 142 is input from the voltage detector 140 to the controller 120 as the voltage data.

The controller 120 controls the operation of the power converter 110 based on the voltage data input. Specifically, the controller 120 controls the operation of the power converter 110 so that the potential of the voltage data input approaches a predetermined potential.

Here, since the ends of the current detection resistor 131 are short-circuited in the voltage control period, power loss caused by current flowing through the current detection resistor 131 can be ignored. Further, since the resistance of the resistor 141 and the resistor 142 in the voltage detector 140 is much higher than the resistance of the load 105, power loss caused by the voltage detector 140 can be largely ignored. Consequently, in the voltage control period, driving is performed with extremely high power efficiency.

The power supply circuit is operated by switching the current control period and the voltage control period alternately. Thus, the entire operation can be performed with high power efficiency.

In the power supply circuit, the voltage control period is preferably set longer than the current control period. By setting the voltage control period relatively long, the power efficiency of the power supply circuit can be further increased.

Specific Example

A specific structure example of the power supply circuit in FIG. 1 is described below with reference to a drawing. Note that in the following description, a description overlapping the above description might be omitted.

Figure 2:
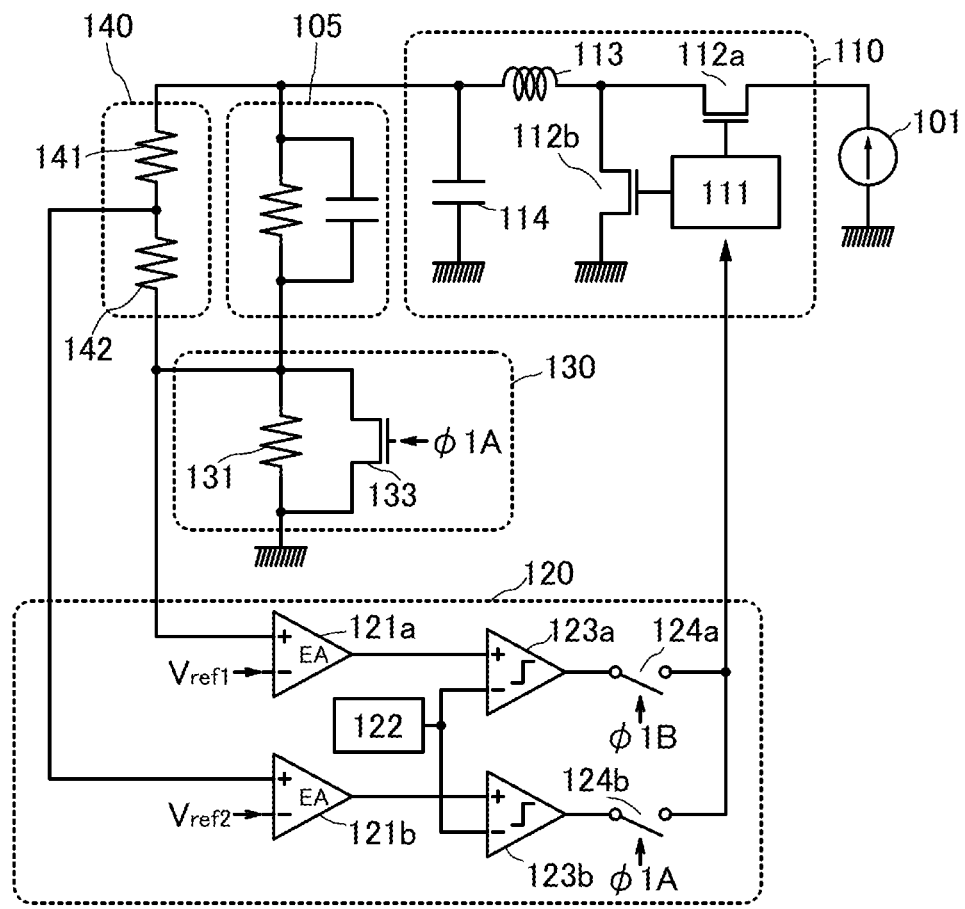
FIG. 2 illustrates a structure example of a power supply circuit according to one embodiment of the present invention.

A power supply circuit in FIG. 2 differs from the power supply circuit in FIG. 1 in the structures of the power converter 110, the controller 120, and the current detector 130. Here, a step-down switching converter is used as the power converter 110, for example.

The power converter 110 includes a driver 111, a transistor 112a, a transistor 112b, a coil 113, and a capacitor 114.

A first electrode of the transistor 112a is electrically connected to an output portion of the DC power source 101. A second electrode of the transistor 112a is connected to a first electrode of the transistor 112b and a first terminal of the coil 113. A second electrode of the transistor 112b is grounded. A second terminal of the coil 113 is connected to the load 105 and a first terminal of the capacitor 114. A second terminal of the capacitor 114 is grounded.

An output signal is input from the controller 120 to the driver 111. The driver 111 turns on and off the transistor 112a and the transistor 112b alternately in response to the signal.

In the case where the potential of the signal input from the controller 120 is low, the driver 111 may have a function of amplifying the signal to power needed for switching the transistor 112a and the transistor 112b and outputting the power.

The capacitor 114 is provided to smooth an output potential. Note that the capacitor 114 is not necessarily provided.

Here, the power converter 110 outputs stable direct current (DC) voltage that is lower than DC voltage input from the DC power source 101 to the load 105. As a period during which the transistor 112a is on becomes long (i.e., a duty cycle becomes high), the output potential becomes high. As the period during which the transistor 112a is on becomes short (i.e., the duty cycle becomes low), the output potential becomes low.

In the current detector 130, a transistor 133 is used instead of the switch 132 in the power supply circuit in FIG. 1. A control signal φ1A is input to a gate of the transistor 133. The on state and off state of the transistor 133 are controlled by the control signal φ1A.

The controller 120 includes two error amplifiers (an error amplifier 121a and an error amplifier 121b), a triangle wave generator 122, two comparators (a comparator 123a and a comparator 123b), and two switches (a switch 124a and a switch 124b).

Current data output from the current detector 130 is input to a non-inverting input terminal of the error amplifier 121a. A reference potential $V_{ref1}$ is input to an inverting input terminal of the error amplifier 121a. An output terminal of the error amplifier 121a is electrically connected to a non-inverting input terminal of the comparator 123a. A triangle wave output from the triangle wave generator 122 is input to an inverting input terminal of the comparator 123a. An output terminal of the comparator 123a is electrically connected to one terminal of the switch 124a.

Voltage data output from the voltage detector 140 is input to a non-inverting input terminal of the error amplifier 121b. A reference potential $V_{ref2}$ is input to an inverting input terminal of the error amplifier 121b. An output terminal of the error amplifier 121b is electrically connected to a non-inverting input terminal of the comparator 123b. A triangle wave output from the triangle wave generator 122 is input to an inverting input terminal of the comparator 123b. An output terminal of the comparator 123b is electrically connected to one terminal of the switch 124b.

The error amplifier 121a compares the reference potential $V_{ref1}$ input to the inverting input terminal to the value of the current data input to the non-inverting input terminal, amplifies its error, and outputs the amplified error. Similarly, the error amplifier 121b amplifies an error between the reference potential $V_{ref2}$ and the potential of the voltage data and outputs the amplified error.

The triangle wave generator 122 outputs a triangle wave. Here, the shape, frequency, amplitude, and the like of a triangle wave output are selected as appropriate depending on the structure of another element included in the controller 120, the structure of the power converter 110, and the like. Further, it is preferable that the triangle wave generator 122 can change the frequency of a triangle wave depending on the size of the load. For example, the triangle wave generator 122 sets the frequency high in the case where output current from the power converter 110 is high, and sets the frequency low in the case where the output current is low. Consequently, power loss caused by charging and discharging of gate capacitance at the time of switching the transistor in the power converter 110 can be reduced.

The comparator 123a compares the magnitude of an output potential from the error amplifier 121a to the magnitude of the potential of a triangle wave, and outputs a pulse potential having a duty cycle based on the magnitude. Similarly, the comparator 123b compares an output potential from the error amplifier 121b to the potential of a triangle wave, and outputs a pulse potential having a duty cycle based on the magnitude.

The control signal φ1A is input to the switch 124b. An inversion control signal φ1B whose phase is inverted from the phase of the control signal φ1A is input to the switch 124a. Accordingly, the switch 124a and the switch 124b are alternately turned on and off.

Here, a node connected to the other terminal of the switch 124a and the other terminal of the switch 124b corresponds to an output portion of the controller 120. The potential of the node is input to the driver 111 in the power converter 110.

Next, the operation of the power supply circuit is described.

In a current control period, a signal for turning off the transistor 133 and the switch 124b is input as the control signal φ1A. A signal for turning on the switch 124a is input as the inversion control signal φ1B.

Here, since the switch 124a is turned on and the switch 124b is turned off, a signal is output from the controller 120 to the power converter 110 via the current detector 130, the error amplifier 121a, the comparator 123a, and the switch 124a. In other words, a signal generated based on current data is output from the controller 120 to the power converter 110.

In a voltage control period, a signal for turning on the transistor 133 and the switch 124b is input as the control signal φ1A. A signal for turning off the switch 124a is input as the inversion control signal φ1B.

Here, since the switch 124a is turned off and the switch 124b is turned on, a signal is output from the controller 120 to the power converter 110 via the voltage detector 140, the error amplifier 121b, the comparator 123b, and the switch 124b. In other words, a signal generated based on voltage data is output from the controller 120 to the power converter 110.

Here, since the ends of the current detection resistor 131 are short-circuited in the voltage control period, power loss caused by current flowing through the current detection resistor 131 can be ignored. Further, since the resistance of the resistor 141 and the resistor 142 in the voltage detector 140 is much higher than the resistance of the load 105, power loss caused by the voltage detector 140 can be largely ignored. Consequently, in the voltage control period, driving is performed with extremely high power efficiency.

The power supply circuit is operated by switching the current control period and the voltage control period alternately. Thus, the entire operation can be performed with high power efficiency.

In the power supply circuit, the voltage control period is preferably set longer than the current control period. By setting the voltage control period relatively long, the power efficiency of the power supply circuit can be further increased.

This embodiment can be combined with any of the other embodiments disclosed in this specification as appropriate.

(Embodiment 2)

In this embodiment, another structure example of the power supply circuit described in the above embodiment is described with reference to drawings. Note that in the following description, a description overlapping the above description might be omitted.

The resistance of a load connected to a power supply circuit might vary for various reasons. For example, the resistance of a light-emitting element such as an LED or an organic EL element varies due to heat generated by emission of the element. In order to keep the emission luminance of the light-emitting element constant, current flowing through the light-emitting element needs to be kept constant. Thus, a power supply circuit for supplying power to a light-emitting device including such a light-emitting element needs to operate such that current flowing through the light-emitting element in the light-emitting device that is a load of the power supply circuit is always constant.

A power supply circuit illustrated in this embodiment has a function of acquiring information on voltage applied to an element in a current control period and controlling the operation of a power converter based on the voltage information acquired in the current control period in a voltage control period. Thus, even when an element whose resistance varies is used as a load connected to the power supply circuit, the voltage information can be always updated. Consequently, stable power can be supplied to the load.

Structure Example

Figure 3:
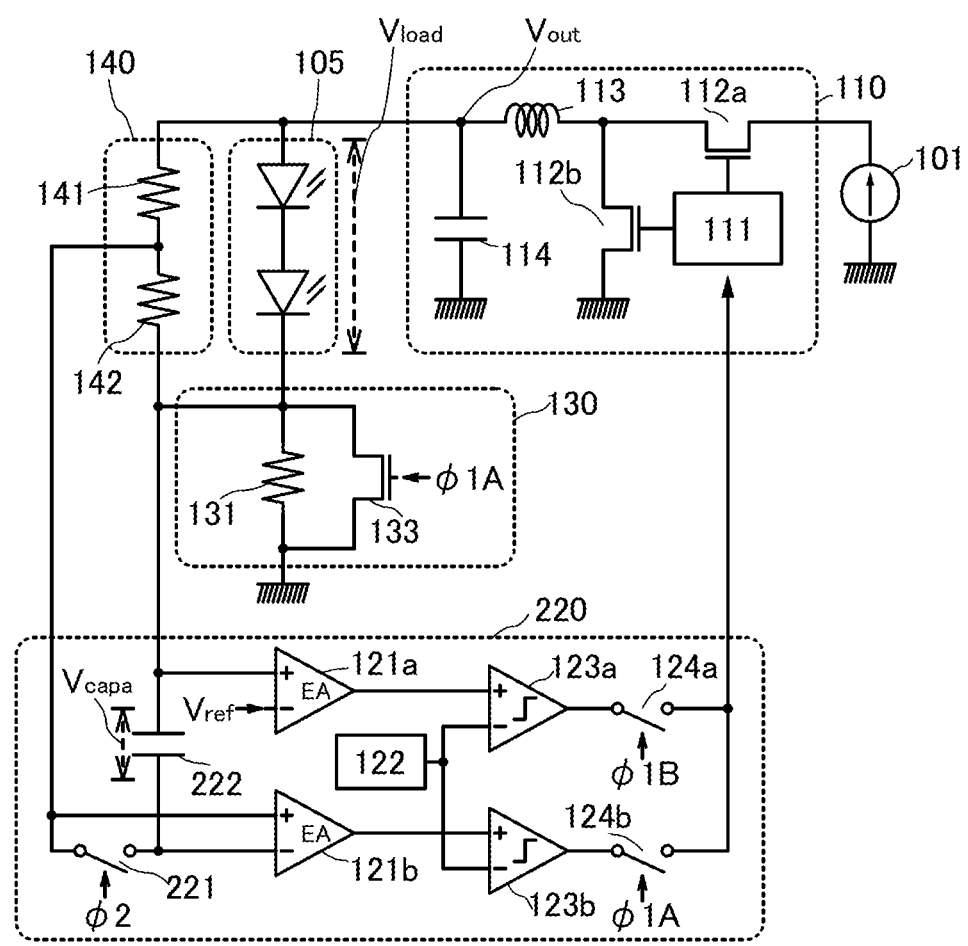
FIG. 3 illustrates a structure example of a power supply circuit according to one embodiment of the present invention.

FIG. 3 illustrates a power supply circuit in this structure example. The power supply circuit in FIG. 3 differs from the power supply circuit in FIG. 2 in that a controller 220 whose structure is different from that of the controller 120 is provided and that a light-emitting element is connected as the load 105.

In this embodiment, a light-emitting element is used as a specific example of the load 105. The structure of a load applicable to the power supply circuit in this structure example is not limited thereto, and a variety of loads can be used. In particular, the power supply circuit illustrated in this embodiment is suitable for an element whose resistance varies due to an external factor.

The controller 220 includes two error amplifiers (the error amplifier 121a and the error amplifier 121b), the triangle wave generator 122, two comparators (the comparator 123a and the comparator 123b), two switches (the switch 124a and the switch 124b), a switch 221, and a storage capacitor 222.

Current data output from the current detector 130 is input to the non-inverting input terminal of the error amplifier 121a. The non-inverting input terminal of the error amplifier 121a is electrically connected to one terminal of the storage capacitor 222. A reference potential $V_{ref}$ is input to the inverting input terminal of the error amplifier 121a. Voltage data output from the voltage detector 140 is input to the non-inverting input terminal of the error amplifier 121b. The non-inverting input terminal of the error amplifier 121b is electrically connected to one terminal of the switch 221. The inverting input terminal of the error amplifier 121b is electrically connected to the other terminal of the switch 221 and the other terminal of the storage capacitor 222.

Note that the structure of the controller 220 is similar to that of the controller 120 in FIG. 2 except for the error amplifier 121a, the error amplifier 121b, the switch 221, and the storage capacitor 222.

The on state and off state of the switch 221 are controlled by a control signal φ2. The storage capacitor 222 holds the potential of voltage data output from the voltage detector 140 in a voltage control period. The switch 221 and the storage capacitor 222 correspond to a storage.

The operation of the power supply circuit in FIG. 3 is described below with reference to FIG. 3 and FIG. 4.

Here, voltage applied across the storage capacitor 222, voltage applied to the load 105, and output voltage from the power converter 110 (voltage applied across the capacitor 114) are denoted by $V_{capa}$, $V_{load}$, and $V_{out}$, respectively.

The transistor 133, the switch 124a, the switch 124b, and the switch 221 are turned on when the potential of a control signal input (φ1A, φ1B, or φ2) is high, and are turned off when the potential of the control signal input is low.

Figure 4:
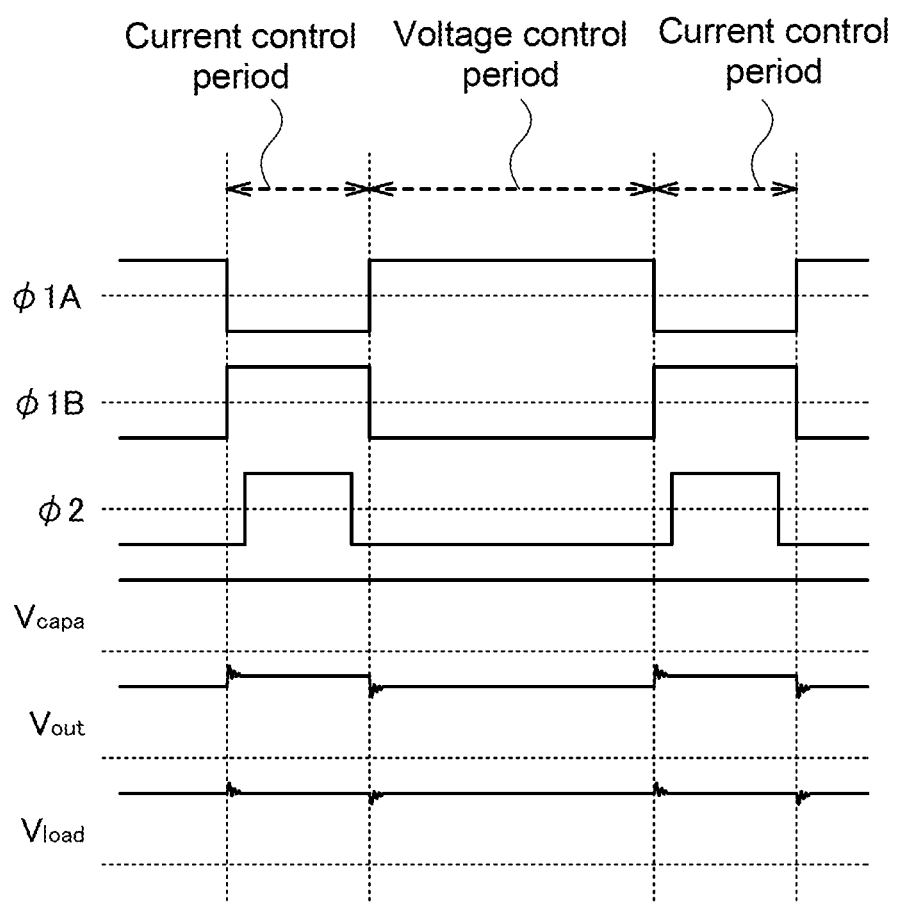
FIG. 4 illustrates operation of a power supply circuit according to one embodiment of the present invention.

FIG. 4 is a timing chart illustrating an operation example of the power supply circuit.

The power supply circuit is operated by switching a current control period and a voltage control period alternately.

First, operation in the current control period is described.

In the current control period, a low-level potential, a high-level potential, and a high-level potential are input as the control signal φ1A, the inversion control signal φ1B, and the control signal φ2, respectively. Thus, the transistor 133 and the switch 124b are turned off, and the switch 124a and the switch 221 are turned on.

Accordingly, the controller 220 controls the operation of the power converter 110 so that the value of current data input to the error amplifier 121a approaches the reference potential $V_{ref}$.

Here, since the switch 221 is on, the potential of the voltage data output from the voltage detector 140 is held in the storage capacitor 222. Specifically, voltage that is equal to voltage applied across the resistor 142 is held in the storage capacitor 222 as $V_{capa}$ applied across the storage capacitor 222.

Then, just before the power supply circuit shifts from the current control period to the voltage control period, first, the control signal φ2 is changed from the high-level potential into a low-level potential. Thus, the switch 221 is turned off.

By turning off the switch 221 before the power supply circuit shifts to the voltage control period, the potential of the voltage data acquired in the current control period can be held in the storage capacitor 222.

After that, the control signal φ1A is changed from the low-level potential into a high-level potential, and the inversion control signal φ1B is changed from the high-level potential into a low-level potential. Thus, the transistor 133 and the switch 124b are turned on, and the switch 124a is turned off.

At this time, an output potential from the voltage detector 140, specifically, a high-potential side potential applied to the resistor 142 is input to the non-inverting input terminal of the error amplifier 121b. In addition, the high-potential side potential $V_{capa}$ of the storage capacitor 222 is input to the inverting input terminal of the error amplifier 121b. Thus, the controller 220 controls the operation of the power converter 110 so that the potential of the voltage data approaches the potential held in the storage capacitor 222.

Here, the voltage applied across the storage capacitor 222 is equal to voltage applied across the resistor 142 in the current control period. Thus, in the voltage control period, each of a low-potential side potential of the storage capacitor 222 and a low-potential side potential of the resistor 142 is decreased to a ground potential, so that each of the high-potential side potential of the storage capacitor 222 and the high-potential side potential of the resistor 142 is decreased to a corresponding extent. Consequently, when the controller 220 controls the operation of the power converter 110 so that the high-potential side potential of the resistor 142 approaches a potential that is equal to the high-potential side potential of the storage capacitor 222 in the voltage control period, the voltage applied to the load 105 can be equal to voltage applied to the load 105 in the current control period.

Note that the output voltage $V_{out}$ in the current control period corresponds to voltage applied to the load 105 and the current detection resistor 131. In contrast, in the voltage control period, the ends of the current detection resistor 131 are short-circuited; thus, the output voltage $V_{out}$ is equal to voltage applied to the load 105, i.e., $V_{load}$.

In this manner, in the voltage control period, the controller 220 controls the power converter 110 based on the voltage data output from the voltage detector 140 acquired in the current control period. At this time, the current detector 130 is deactivated, so that power loss in the current detector 130 is negligibly small.

Note that when the power supply circuit shifts from the current control period to the voltage control period as indicated by $V_{load}$ in FIG. 4, the output potential from the power converter 110 and the voltage applied to the load 105 are instantaneously decreased due to short-circuit of the ends of the current detection resistor 131 in the current detector 130. Similarly, when the power supply circuit shifts from the voltage control period to the current control period, the output potential from the power converter 110 and the voltage applied to the load 105 are instantaneously increased. However, this voltage can be restored in an extremely short time. For example, in the case where a light-emitting element is used as the load 105, a change in voltage leads to a change in emission luminance. However, the restoration time is several milliseconds or shorter at most, which is an extremely short time; thus, the change is not perceived.

In this manner, the power supply circuit is driven by switching the voltage control period and the current control period alternately.

Here, as the voltage control period becomes relatively long compared to the current control period, the power efficiency of the power supply circuit can be increased.

The allowable length of the voltage control period can be estimated using Formula (1).

$$T_{Hold} = \frac{C_S \times \Delta V}{I_{leak}} \quad (1)$$

Here, $T_{Hold}$, $C_S$, $I_{leak}$, and $\Delta V$ represent the allowable length of the voltage control period, the capacitance of the storage capacitor 222, the off-state leakage current of the switch 221, and the allowable variable of voltage applied to the storage capacitor 222, respectively.

For example, in the case where a capacitor having a capacitance of 1 μF is used as the storage capacitor 222 and a switch having an off-state leakage current of 60 pA is used as the switch 221 assuming that a laminated ceramic capacitor and a silicon transistor are used, $T_{Hold}$ is about 20.83 s at an initial value of the voltage applied to the storage capacitor 222 of 1.25 V and an allowable variable of 0.1% of the initial voltage value ($\Delta V$=0.00125 V).

In contrast, the current control period is at least longer than or equal to a period during which electricity is stored in the storage capacitor 222, and for example, can be about 10 μs to 1 ms. Thus, the voltage control period can be $10^2$ or more times, preferably $10^3$ or more times as long as the current control period.

Here, from Formula (1), any of the following two methods can be employed as a promising method for further extending the voltage control period: increasing the capacitance of the storage capacitor 222, and reducing the off-state leakage current of the switch 221.

Here, a transistor including an oxide semiconductor in a semiconductor layer where a channel is formed is preferably used as the switch 221.

An oxide semiconductor has a high energy gap of 3.0 eV or more. A transistor including an oxide semiconductor layer obtained by processing of an oxide semiconductor in an appropriate condition and a sufficient reduction in carrier density of the oxide semiconductor can have much lower leakage current between a source and a drain in an off state (off-state current) than a conventional transistor including silicon.

In the case where the transistor including an oxide semiconductor is used as the switch 221, it is preferable that another element included in the controller be formed in a CMOS process, the transistor be stacked over the element, and that these elements be electrically connected to each other through a contact plug. With such a structure, the area occupied by the controller can be reduced.

An oxide semiconductor to be used preferably contains at least indium (In) or zinc (Zn). In particular, the oxide semiconductor preferably contains In and Zn. In addition, as a stabilizer for reducing variations in electrical characteristics of a transistor including the oxide semiconductor, the oxide semiconductor preferably contains gallium (Ga) in addition to In and Zn. Tin (Sn) is preferably contained as a stabilizer. It is preferable that one or more kinds of elements selected from hafnium (Hf), zirconium (Zr), titanium (Ti), scandium (Sc), yttrium (Y), and lanthanoid (e.g., cerium (Ce), neodymium (Nd), or gadolinium (Gd)) be contained as a stabilizer.

As the oxide semiconductor, for example, any of the following can be used: indium oxide, tin oxide, zinc oxide, an In—Zn-based oxide, a Sn—Zn-based oxide, an Al—Zn-based oxide, a Zn—Mg-based oxide, a Sn—Mg-based oxide, an In—Mg-based oxide, an In—Ga-based oxide, an In—Ga—Zn-based oxide, an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—Zr—Zn-based oxide, an In—Ti—Zn-based oxide, an In—Sc—Zn-based oxide, an In—Y—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

Here, an In—Ga—Zn-based oxide means an oxide containing In, Ga, and Zn as main components, and there is no limitation on the ratio of In, Ga, and Zn. In addition, the In—Ga—Zn—O-based oxide may contain a metal element other than In, Ga, and Zn.

A material represented by $InMO_3(ZnO)_m$ (m>0, where m is not an integer) may be used as the oxide semiconductor. Note that M denotes one or more metal elements selected from Ga, Fe, Mn, or Co or the above element as a stabilizer. A material represented by $In_2SnO_5(ZnO)_n$ (n>0, where n is an integer) may be used as the oxide semiconductor.

For example, an In—Ga—Zn-based oxide with an atomic ratio of In:Ga:Zn=1:1:1, In:Ga:Zn=3:1:2, or In:Ga:Zn=2:1:3, or an oxide whose composition is in the neighborhood of the above composition is preferably used.

The oxide semiconductor layer may be either single crystal or non-single-crystal. In the latter case, the oxide semiconductor layer may be either amorphous or polycrystalline.

Further, the oxide semiconductor layer may have either an amorphous structure including a crystalline portion or a non-amorphous structure.

An oxide semiconductor film is preferably a c-axis aligned crystalline oxide semiconductor (CAAC-OS) film.

A CAAC-OS film is described below.

The CAAC-OS film is not completely single crystal nor completely amorphous. The CAAC-OS film is an oxide semiconductor film with a crystal-amorphous mixed phase structure where crystal parts are included in an amorphous phase. Note that in most cases, the crystal part fits into a cube whose one side is less than 100 nm. From an observation image obtained with a transmission electron microscope (TEM), a boundary between the amorphous part and the crystal part in the CAAC-OS film is not clear. Further, with the TEM, a grain boundary in the CAAC-OS film is not found. Thus, in the CAAC-OS film, a reduction in electron mobility, due to the grain boundary, is suppressed.

In each of the crystal parts included in the CAAC-OS film, a c-axis is aligned in a direction parallel to a normal vector of a surface where the CAAC-OS film is formed or a normal vector of a surface of the CAAC-OS film, triangular or hexagonal atomic order which is seen from the direction perpendicular to the a-b plane is formed, and metal atoms are arranged in a layered manner or metal atoms and oxygen atoms are arranged in a layered manner when seen from the direction perpendicular to the c-axis. Note that, among crystal parts, the directions of the a-axis and the b-axis of one crystal part may be different from those of another crystal part. In this specification, a simple term "perpendicular" includes a range of 85 to 95°. In addition, a simple term "parallel" includes a range of −5 to 5°.

In the CAAC-OS film, the distribution of crystal parts is not necessarily uniform. For example, in the formation process of the CAAC-OS film, in the case where crystal growth occurs from a surface side of the oxide semiconductor film, the proportion of crystal parts in the vicinity of the surface of the CAAC-OS film is higher than that in the vicinity of the surface where the CAAC-OS film is formed in some cases. Further, when an impurity is added to the CAAC-OS film, the crystal part in a region to which the impurity is added becomes amorphous in some cases.

Since the c-axes of the crystal parts in the CAAC-OS film are aligned in the direction parallel to the normal vector of the surface where the CAAC-OS film is formed or the normal vector of the surface of the CAAC-OS film, the directions of the c-axes may be different from each other depending on the shape of the CAAC-OS film (the cross-sectional shape of the surface where the CAAC-OS film is formed or the cross-sectional shape of the surface of the CAAC-OS film). Note that when the CAAC-OS film is formed, the c-axis direction of the crystal part is the direction parallel to the normal vector of the surface where the CAAC-OS film is formed or the normal vector of the surface of the CAAC-OS film. The crystal part is formed by deposition or by performing treatment for crystallization such as heat treatment after deposition.

There are three methods for forming a CAAC-OS film as the oxide semiconductor film.

The first method is depositing an oxide semiconductor film at a temperature of 200 to 450° C. to form, in the oxide semiconductor film, crystal parts in which the c-axes are aligned in the direction parallel to the normal vector of a surface where the oxide semiconductor film is formed or the normal vector of a surface of the oxide semiconductor film.

The second method is depositing a thin oxide semiconductor film and then heating it at a temperature of 200 to 700° C.

to form, in the oxide semiconductor film, crystal parts in which the c-axes are aligned in the direction parallel to the normal vector of a surface where the oxide semiconductor film is formed or the normal vector of a surface of the oxide semiconductor film.

The third method is depositing a first thin oxide semiconductor film, then heating it at a temperature of 200 to 700° C., and depositing a second oxide semiconductor film to form, in the oxide semiconductor film, crystal parts in which the c-axes are aligned in the direction parallel to the normal vector of a surface where the oxide semiconductor film is formed or the normal vector of a surface of the oxide semiconductor film.

In a transistor including a CAAC-OS film, a change in electrical characteristic due to irradiation with visible light or ultraviolet light is small. Thus, the transistor has high reliability.

The above is the description of the CAAC-OS film.

After formation of the oxide semiconductor film, it is preferable that dehydration treatment (dehydrogenation treatment) be performed to remove hydrogen or moisture from the oxide semiconductor film so that the oxide semiconductor film is highly purified to contain impurities as little as possible, and that oxygen be added to the oxide semiconductor film to fill oxygen vacancies increased by the dehydration treatment (dehydrogenation treatment). In this specification and the like, supplying oxygen to an oxide semiconductor film is expressed as oxygen adding treatment in some cases.

In this manner, hydrogen or moisture is removed from the oxide semiconductor film by dehydration treatment (dehydrogenation treatment) and oxygen vacancies are filled by oxygen adding treatment, so that the oxide semiconductor film can be an intrinsic (i-type) or substantially intrinsic oxide semiconductor film. Such an oxide semiconductor film contains extremely few (close to zero) carriers derived from a donor, and has a carrier concentration of lower than $1 \times 10^{14}/cm^3$, preferably lower than $1 \times 10^{12}/cm^3$, more preferably lower than $1 \times 10^{11}/cm^3$, still more preferably lower than $1.45 \times 10^{10}/cm^3$.

The transistor including an oxide semiconductor layer which is highly purified by a sufficient reduction in hydrogen concentration and in which defect levels in an energy gap due to oxygen vacancies are reduced by sufficient supply of oxygen can have quite excellent off-state current characteristics. For example, the off-state current (per unit channel width (1 μm) here) at room temperature (25° C.) is 100 zA (1 zA (zeptoampere) is $1 \times 10^{-21}$ A) or lower, preferably 10 zA or lower. The off-state current at 85° C. is 100 zA ($1 \times 10^{-19}$ A) or lower, preferably 10 zA ($1 \times 10^{-20}$ A) or lower. In this manner, a transistor which has quite excellent off-state current characteristics can be obtained with the use of an intrinsic (i-type) or substantially intrinsic oxide semiconductor layer.

The transistor including such an oxide semiconductor has extremely low off-state current. Thus, by using the transistor as the switch 221, the voltage control period can be extremely long. Consequently, the voltage control period can be $10^5$ or more times, preferably $10^6$ or more times as long as the current control period, for example.

By using such a transistor, the power efficiency of the power supply circuit can be further increased.

The above is the description of this structure example.

With such a structure, the current detector for detecting current flowing through the load is deactivated in the voltage control period; thus, power loss in the current detector in this period can be eliminated. When voltage control and current control can be performed and the voltage control period and the current control period can be switched in this manner, the conversion efficiency of the power supply circuit can be increased.

In the voltage control period, the controller can control the operation of the power converter based on the voltage data acquired in the current control period. In addition, the voltage data can be always updated by repeating the current control period and the voltage control period alternately, and control can be performed so that the current value is always constant even when the size of the load varies. Thus, the power supply circuit can be driven stably with high conversion efficiency. Accordingly, with such a structure, for example, it is possible to obtain a power supply circuit which is suitable for supplying power to a light-emitting device including a light-emitting element such as an organic EL element or an LED element.

Next, examples of a power supply circuit having a controller whose structure is different from the above structure are described.

[Modification 1]

Figure 5:
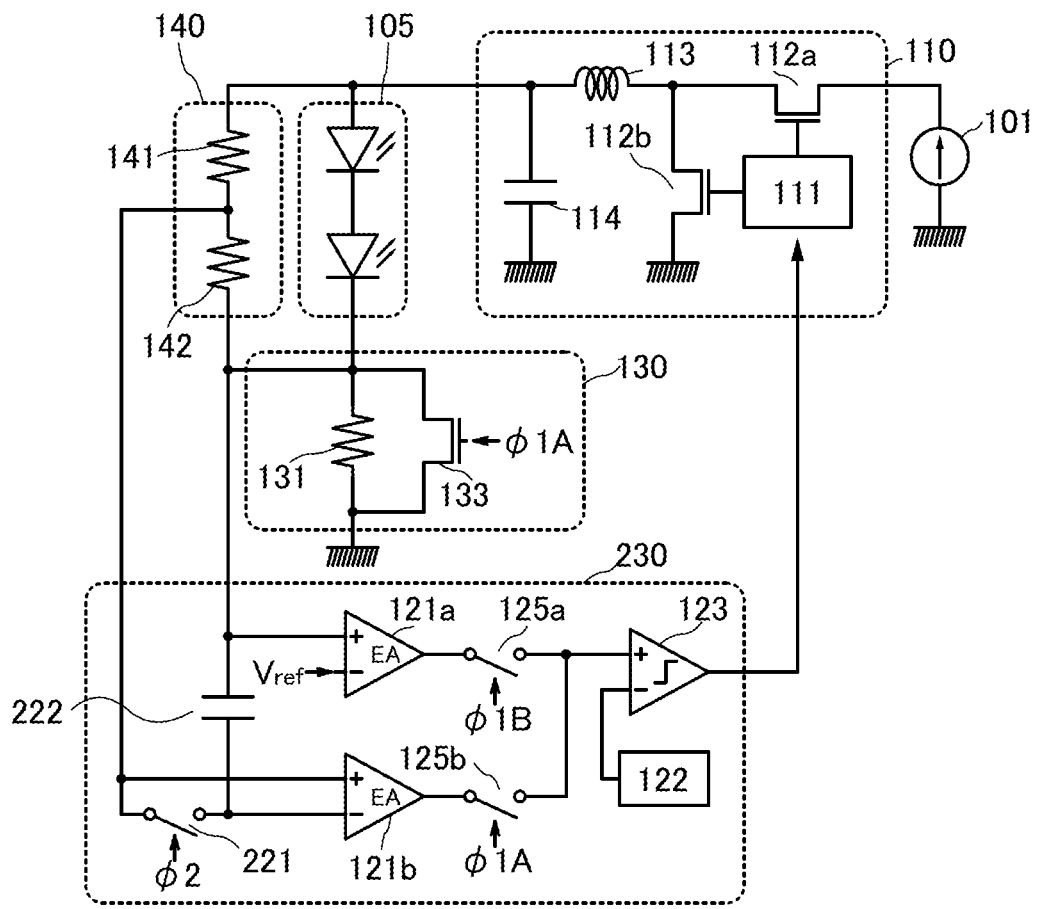
FIG. 5 illustrates a structure example of a power supply circuit according to one embodiment of the present invention.

FIG. 5 illustrates the structure of a power supply circuit in this modification. The power supply circuit in FIG. 5 is the same as the power supply circuit in FIG. 3 except for the structure of a controller.

A controller 230 includes one comparator 123 instead of the two comparators (the comparator 123a and the comparator 123b) in the controller 220 in FIG. 3. Further, the controller 230 includes a switch 125a and a switch 125b instead of the two switches (the switch 124a and the switch 124b) in the controller 220.

The output terminal of the error amplifier 121a is electrically connected to a non-inverting input terminal of the comparator 123 through the switch 125a. The output terminal of the error amplifier 121b is electrically connected to the non-inverting input terminal of the comparator 123 through the switch 125b. A triangle wave output from the triangle wave generator 122 is input to an inverting input terminal of the comparator 123.

The on state and off state of the switch 125b are controlled by the control signal φ1A. The on state and off state of the switch 125a are controlled by the inversion control signal φ1B.

In a current control period, the switch 125a is turned on, and the switch 125b is turned off. Thus, output from the error amplifier 121a is input to the non-inverting input terminal of the comparator 123 through the switch 125a.

In a voltage control period, the switch 125a is turned off, and the switch 125b is turned on. Thus, output from the error amplifier 121b is input to the non-inverting input terminal of the comparator 123 through the switch 125b.

With such a structure, one comparator can be used in common, so that the circuit structure can be simplified.

[Modification 2]

Figure 6:
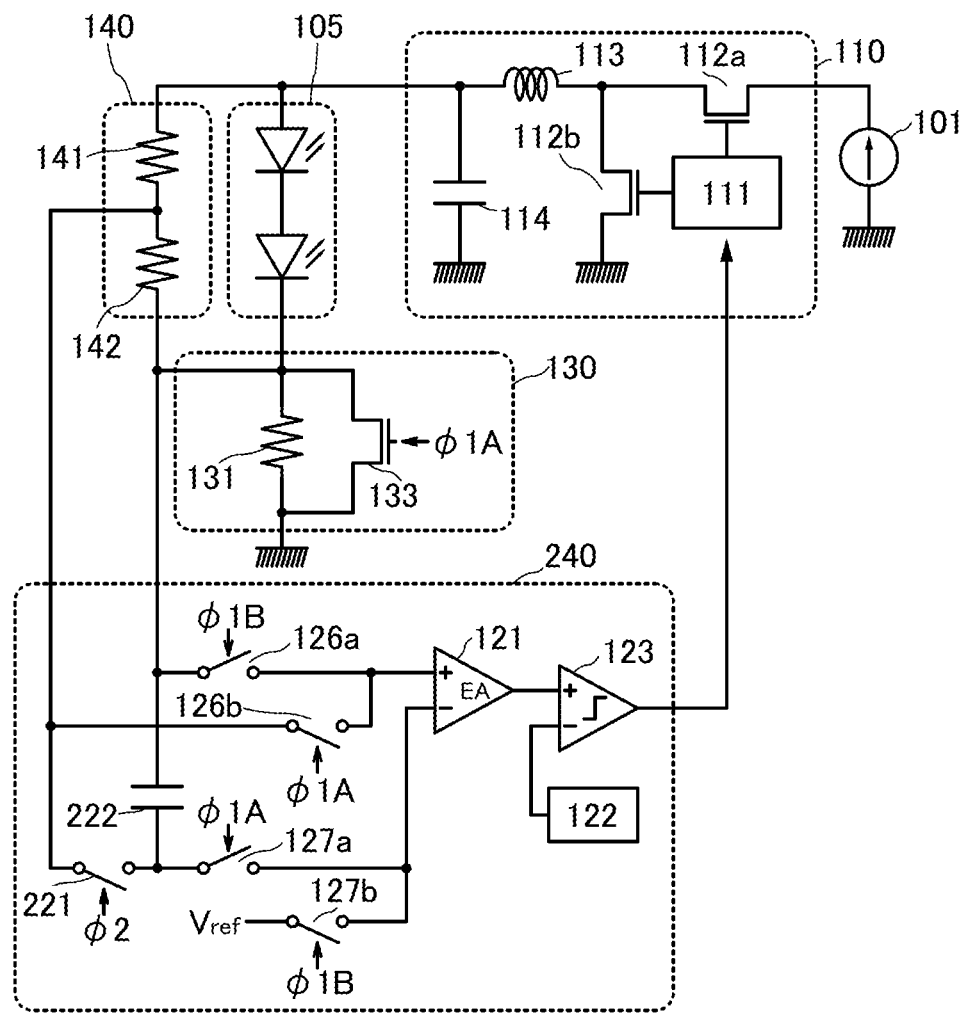
FIG. 6 illustrates a structure example of a power supply circuit according to one embodiment of the present invention.

FIG. 6 illustrates the structure of a power supply circuit in this modification. The power supply circuit in FIG. 6 is the same as the power supply circuit in FIG. 3 except for the structure of a controller.

A controller 240 includes one comparator 123 instead of the two comparators (the comparator 123a and the comparator 123b) in the controller 220 in FIG. 3 and one error amplifier 121 instead of the two error amplifiers (the error amplifier 121a and the error amplifier 121b). Further, the controller 240 includes four switches (a switch 126a, a switch 126b, a switch 127a, and a switch 127b) instead of the two switches (the switch 124a and the switch 124b) in the controller 220.

Current data output from the current detector 130 is input to a non-inverting input terminal of the error amplifier 121 through the switch 126a. Voltage data output from the voltage detector 140 is input to the non-inverting input terminal of the error amplifier 121 through the switch 126b.

The voltage data output from the voltage detector 140 is also input to an inverting input terminal of the error amplifier 121 through the switch 221 and the switch 127a. The reference potential $V_{ref}$ is input to the inverting input terminal of the error amplifier 121 through the switch 127b.

The on state and off state of each of the switch 126b and the switch 127a are controlled by the control signal ϕ1A. The on state and off state of each of the switch 126a and the switch 127b are controlled by the inversion control signal ϕ1B.

In a current control period, the switch 126b and the switch 127a are turned off, and the switch 126a and the switch 127b are turned on.

Thus, current data is input to the non-inverting input terminal of the error amplifier 121 through the switch 126a. The reference potential $V_{ref}$ is input to the inverting input terminal of the error amplifier 121 through the switch 127b. The controller 240 controls driving of the power converter 110 so that the value of the current data input approaches a potential that is equal to the reference potential $V_{ref}$.

In a voltage control period, the switch 126b and the switch 127a are turned on, and the switch 126a and the switch 127b are turned off.

Thus, voltage data is input to the non-inverting input terminal of the error amplifier 121 through the switch 126b. The high-potential side potential of the storage capacitor 222 is input to the inverting input terminal of the error amplifier 121 through the switch 127a. The controller 240 controls driving of the power converter 110 so that the potential of the voltage data input approaches a potential that is equal to the high-potential side potential of the storage capacitor 222.

With such a structure, the comparator 123 and the error amplifier 121 can be used in common, so that the circuit structure can be simplified.

This embodiment can be combined with any of the other embodiments disclosed in this specification as appropriate.

(Embodiment 3)

In this embodiment, another structure example of the power supply circuit described in the above embodiment is described with reference to drawings. Note that in the following description, a description overlapping the above description might be omitted.

In Embodiment 2, the potential (the potential of voltage data) used as the reference potential in the voltage control period is acquired in the current control period and is held using the storage capacitor and the switch. In contrast, in this embodiment, the potential is converted into digital data and is held in a storage.

Structure Example 1

Figure 7:
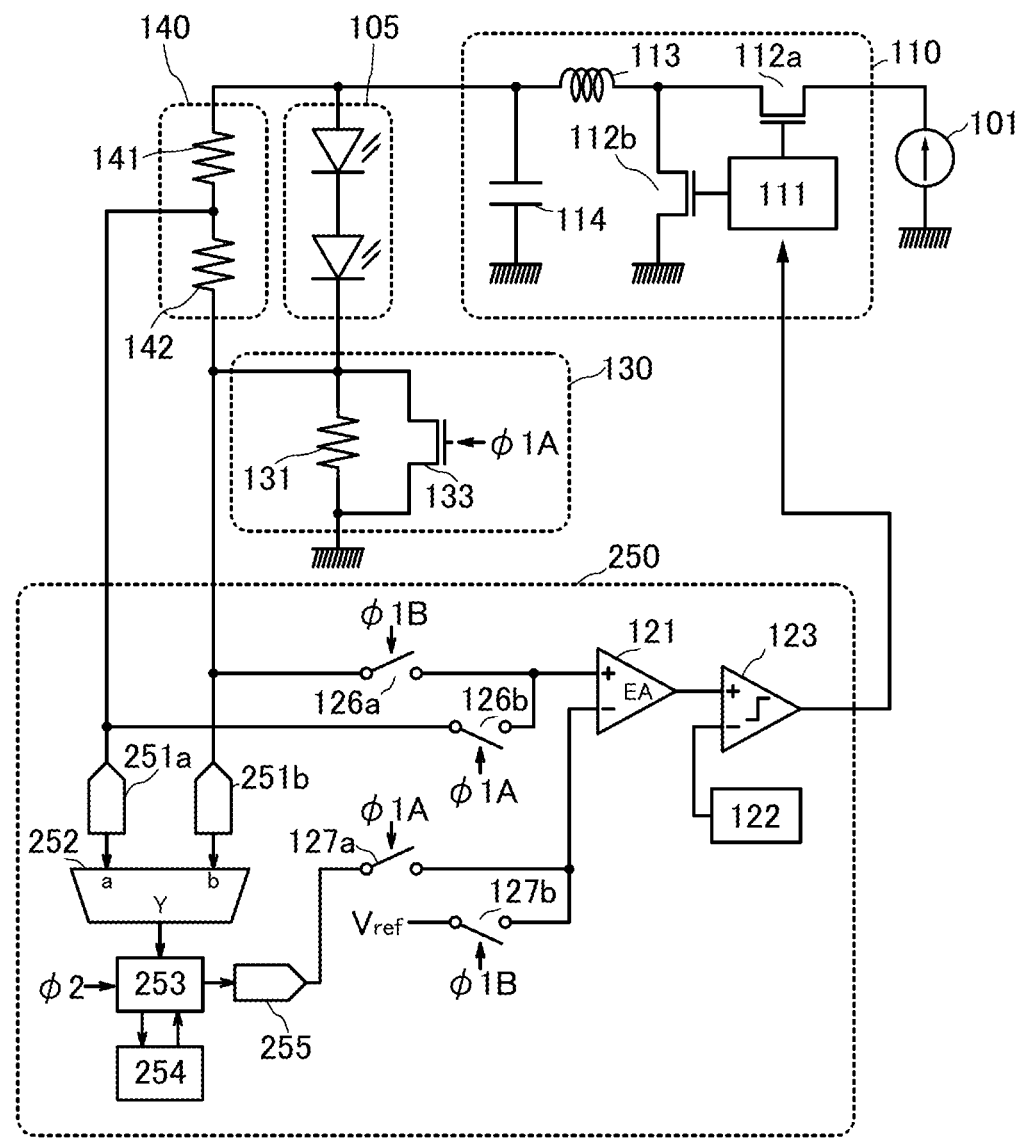
FIG. 7 illustrates a structure example of a power supply circuit according to one embodiment of the present invention.

FIG. 7 illustrates the structure of a power supply circuit in this structure example. The power supply circuit in FIG. 7 is the same as the power supply circuit in FIG. 3 except for the structure of a controller.

A controller 250 includes a storage constituted of two analog-to-digital (AD) converters (an AD converter 251a and an AD converter 251b), a digital logic unit 252, a control circuit 253, a storage device 254, and a digital-to-analog (DA) converter 255 instead of the storage constituted of the switch 221 and the storage capacitor 222 in the controller 230 in Embodiment 2.

Note that in this structure example, a comparator and an error amplifier in the controller are used in common. However, as described in Embodiment 2, one comparator and two error amplifiers may be provided, or two error amplifiers and two comparators may be provided.

A node that is connected to a low-potential side of the resistor 142 in the voltage detector 140 and is supplied with current data from the current detector 130 is divided into two nodes. One of the nodes is electrically connected to the non-inverting input terminal of the error amplifier 121 through the switch 126a. The other of the nodes is electrically connected to the AD converter 251b.

A node to which voltage data is output from the voltage detector 140 is divided into two nodes. One of the nodes is electrically connected to the non-inverting input terminal of the error amplifier 121 through the switch 126b. The other of the nodes is electrically connected to the AD converter 251a.

The AD converter 251a and the AD converter 251b each convert a potential input that is an analog value into a digital value and output the digital value.

Here, the AD converter 251a converts a high-potential side potential applied to the resistor 142 in the voltage detector 140 into a digital value and outputs the digital value to the digital logic unit 252. The AD converter 251b converts a low-potential side potential applied to the resistor 142 in the voltage detector 140 into a digital value and outputs the digital value to the digital logic unit 252.

The digital logic unit 252 calculates a digital value input and outputs the calculation result as a digital value.

Here, the digital logic unit 252 outputs a difference between a digital value input from the AD converter 251a and a digital value input from the AD converter 251b to the control circuit 253. In other words, the output value of the digital logic unit 252 corresponds to the value of voltage applied across the resistor 142 in the voltage detector 140.

The control signal ϕ2 is input to the control circuit 253, and the operation of the control circuit 253 is controlled by the control signal ϕ2. In response to the control signal ϕ2, the control circuit 253 stores data input from the digital logic unit 252 in the storage device 254, or reads data stored in the storage device 254 and outputs the data to the DA converter 255.

The storage device 254 can be a data rewritable storage device. For example, it is possible to use a volatile storage device such as a DRAM or an SRAM, or a nonvolatile storage device such as an MRAM, an ReRAM, a PRAM, or a flash memory. Here, it is preferable to use an SRAM that can be formed in a CMOS process, a register circuit, or the like as the storage device 254 because it can be formed in the same process as another element included in the controller.

The DA converter 255 converts a digital value input into an analog value and outputs the analog value as a potential.

Here, the DA converter 255 converts a digital value output from the control circuit 253 into an analog value and outputs the analog value to the inverting input terminal of the error amplifier 121 through the switch 127a as a potential. The potential output is equal to voltage applied across the resistor 142.

In a current control period, the transistor 133, the switch 126b, and the switch 127a are turned off, and the switch 126a and the switch 127b are turned on. Thus, current data output from the current detector 130 is input to the non-inverting input terminal of the error amplifier 121 through the switch 126a. The reference potential $V_{ref}$ is input to the inverting input terminal of the error amplifier 121 through the switch 127b.

Thus, in the current control period, the controller 250 controls driving of the power converter 110 so that the current data detected in the current detector 130 approaches a potential that is equal to the reference potential $V_{ref}$.

Just before the power supply circuit shifts from the current control period to a voltage control period, in response to the control signal φ2, the control circuit 253 stores data output from the digital logic unit 252 in the storage device 254. Further, at least in the voltage control period, the control circuit 253 reads the data from the storage device 254 and outputs the data to the DA converter 255.

In the voltage control period, the transistor 133, the switch 126b, and the switch 127a are turned on, and the switch 126a and the switch 127b are turned off. Thus, the potential of voltage data output from the voltage detector 140 is input to the non-inverting input terminal of the error amplifier 121 through the switch 126b. A potential output from the DA converter 255 is input to the inverting input terminal of the error amplifier 121 through the switch 127a.

Thus, in the voltage control period, the controller 250 controls driving of the power converter 110 so that the high-potential side potential of the resistor 142 in the voltage detector 140 approaches a potential that is equal to an output potential from the DA converter 255.

In this manner, in the voltage control period, the controller 250 controls the power converter 110 based on the voltage data output from the voltage detector 140 acquired in the current control period. At this time, the current detector 130 is deactivated, so that power loss in the current detector 130 is negligibly small.

In this manner, the power supply circuit is driven by switching the voltage control period and the current control period alternately.

When a storage device capable of retaining voltage data acquired in a current control period is used in a power supply circuit in this manner, a voltage control period can be extremely long. Thus, a power supply circuit with extremely high power efficiency can be obtained.

Structure Example 2

Figure 8:
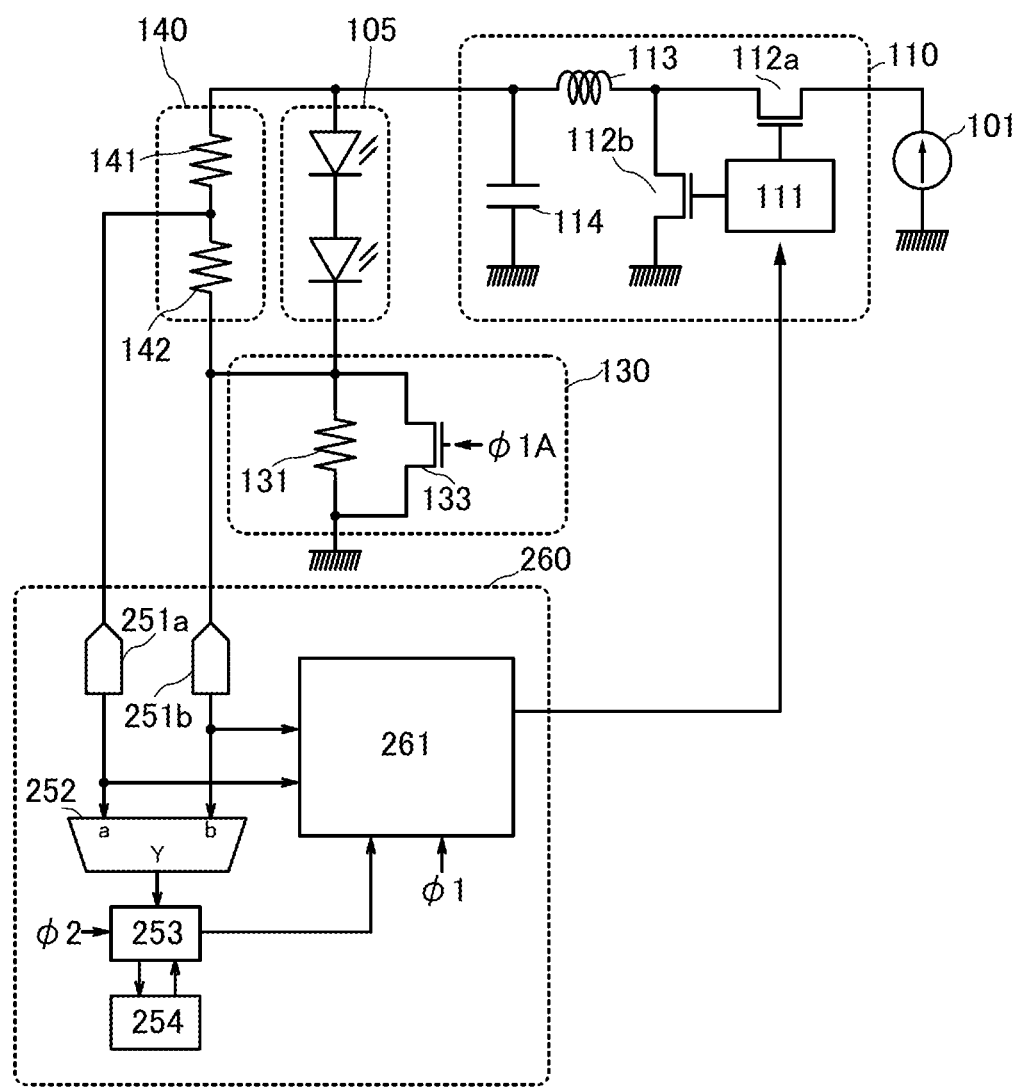
FIG. 8 illustrates a structure example of a power supply circuit according to one embodiment of the present invention.

FIG. 8 illustrates the structure of a power supply circuit in this structure example. The power supply circuit in FIG. 8 is the same as the power supply circuit in FIG. 3 except for the structure of a controller.

A controller 260 includes a digital signal processor (DSP) 261, which fulfills the functions of the switch 126a, the switch 126b, the switch 127a, the switch 127b, the error amplifier 121, the comparator 123, and the triangle wave generator 122 in the controller 250 described in Structure Example 1 in this embodiment. This leads to elimination of the DA converter 255 that is needed in the controller 250.

A node to which voltage data is output from the voltage detector 140 is electrically connected to the AD converter 251a. A digital value output from the AD converter 251a is input to the digital logic unit 252 and the DSP 261.

The node that is connected to the low-potential side of the resistor 142 in the voltage detector 140 and is supplied with current data from the current detector 130 is electrically connected to the AD converter 251b. A digital value output from the AD converter 251b is input to the digital logic unit 252 and the DSP 261.

Data (a digital value) output from the control circuit 253 is input to the DSP 261.

The DSP 261 is a microprocessor capable of performing digital signal processing in real time. Here, the DSP 261 outputs a signal for driving the driver 111 in the power converter 110 based on three digital values input and the control signal φ1.

Here, the driver 111 in the power converter 110 may have a function of amplifying a signal output from the DSP 261, or an additional DA converter may be provided between the driver 111 and the DSP 261.

In a current control period, the DSP 261 controls driving of the power converter 110 so that current data converted into a digital value by the AD converter 251b and predetermined reference data approach the same value based on the current data, i.e., the voltage data converted into a digital value by the AD converter 251b approaches the predetermined reference data.

Just before the power supply circuit shifts from the current control period to a voltage control period, as in Structure Example 1, the control circuit 253 stores data in the storage device 254. Further, at least in the voltage control period, the control circuit 253 outputs the data stored in the storage device 254 to the DSP 261.

In the voltage control period, the DSP 261 controls driving of the power converter 110 so that two pieces of data approach the same value based on data input from the control circuit 253 and voltage data converted into a digital value by the AD converter 251a, i.e., the voltage data converted into a digital value by the AD converter 251a approaches the data input from the control circuit 253.

In this manner, in the voltage control period, the controller 260 controls the power converter 110 based on voltage data output from the voltage detector 140 acquired in the current control period. At this time, the current detector 130 is deactivated, so that power loss in the current detector 130 is negligibly small.

In this manner, the power supply circuit is driven by switching the voltage control period and the current control period alternately.

Note that to facilitate the description, the digital logic unit 252, the control circuit 253, and the storage device 254 are illustrated separately from the DSP 261 in FIG. 8. However, the DSP 261 may have the functions of these circuits performing digital signal processing or a function of retaining data. In such a case, data and signals input to the DSP 261 are only data input from the AD converter 251a and the AD converter 251b, the control signal φ1, and the control signal φ2.

When all the signal processings in the controller 260 can be performed with digital signals in this manner, the power converter 110 can be driven with low power; thus, a power supply circuit with higher efficiency can be obtained. Further, it is possible to obtain a high-reliability power supply circuit having high resistance to aging degradation as compared to the case of an analog circuit.

This embodiment can be combined with any of the other embodiments disclosed in this specification as appropriate.

(Embodiment 4)

In this embodiment, a structure example of the controller of the power supply circuit in Embodiment 2 that has a transistor including an oxide semiconductor in a semiconductor layer where a channel is formed as the switch 221 is described. Here, the switch 221 and the storage capacitor 222 are stacked over another element included in the controller that is formed in a CMOS process.

Figure 9:
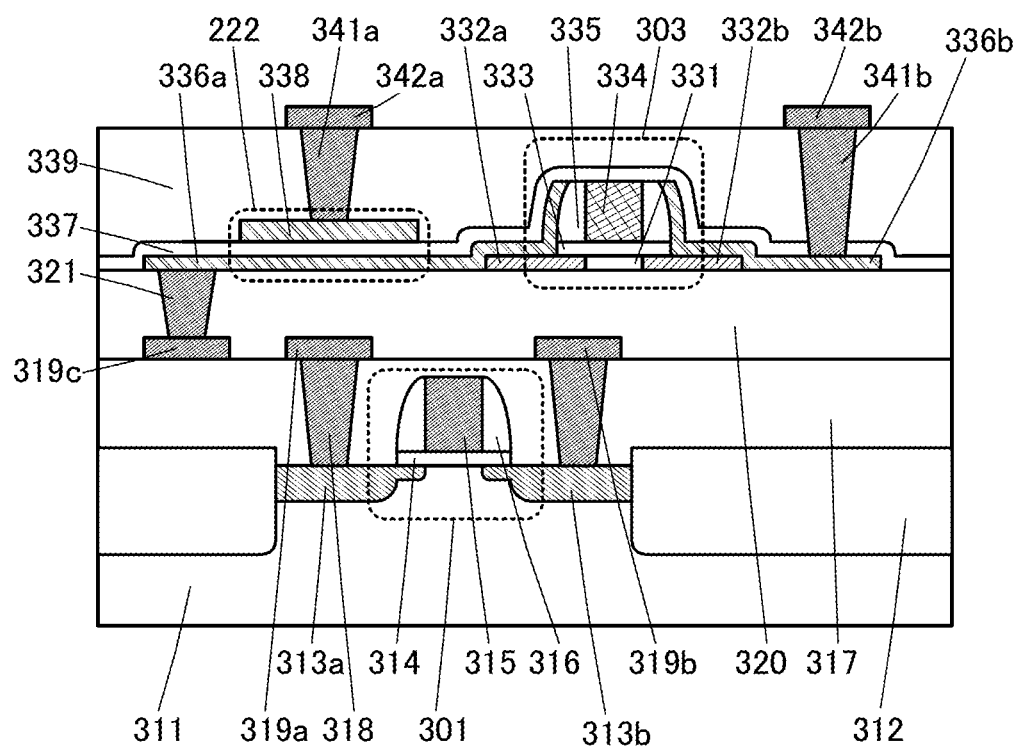
FIG. 9 illustrates a structure example of a power supply circuit according to one embodiment of the present invention.
Figure 10:
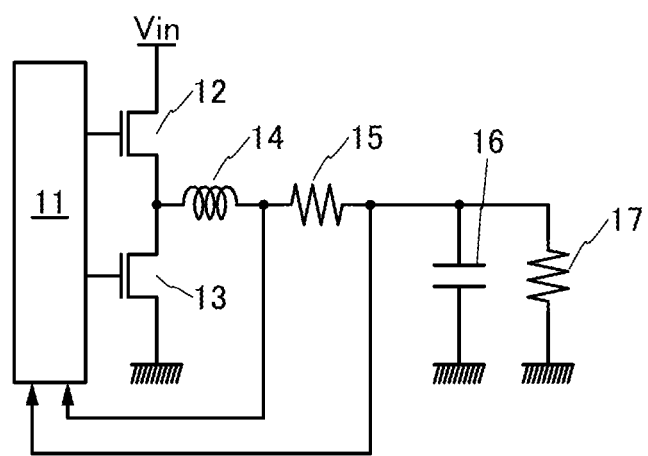
FIG. 10 illustrates an example of a conventional power supply circuit.

In a cross-sectional schematic view in FIG. 9, a transistor including a semiconductor layer where a channel is formed and which contains a Group 14 semiconductor of the periodic table (e.g., silicon) and a transistor including an oxide semiconductor layer where a channel is formed are formed. In this case, the transistor including an oxide semiconductor layer where a channel is formed can be stacked over the transistor including a semiconductor layer which contains a Group 14 semiconductor of the periodic table (e.g., silicon). The transistor including a semiconductor layer which contains a Group 14 semiconductor of the periodic table (e.g., silicon) can be used as the transistor included in the error amplifier 121a, the error amplifier 121b, the comparator 123a, the comparator 123b, the switch 124a, the switch 124b, the triangle wave generator 122, or the like in FIG. 3, for example.

FIG. 9 illustrates a transistor 301 included in an input portion of the error amplifier 121b, and the storage capacitor 222 and a transistor 303 which are electrically connected to the transistor 301 and are provided over the transistor 301. Here, the transistor 303 corresponds to the switch 221 in FIG. 3 and FIG. 4.

In FIG. 9, the transistor 301 including a semiconductor layer which contains a Group 14 semiconductor of the periodic table (e.g., silicon), the transistor 303 including an oxide semiconductor layer where a channel is formed, and the storage capacitor 222 are formed using a semiconductor layer 311, an insulating layer 314, a conductive layer 315, insulating layers 316, an insulating layer 317, connection layers 318, a conductive layer 319a, a conductive layer 319b, a conductive layer 319c, an insulating layer 320, a connection layer 321, a semiconductor layer 331, an insulating layer 333, a conductive layer 334, insulating layers 335, a conductive layer 336a, a conductive layer 336b, an insulating layer 337, a conductive layer 338, an insulating layer 339, a connection layer 341a, a connection layer 341b, a conductive layer 342a, and a conductive layer 342b.

The semiconductor layer 311 includes a region 313a and a region 313b. In addition, adjacent transistors are electrically isolated by insulating layers 312 in some regions of the semiconductor layer 311.

For example, a semiconductor substrate can be used as the semiconductor layer 311. Alternatively, a semiconductor layer over a different substrate can be used as the semiconductor layer 311.

The region 313a and the region 313b are spaced apart from each other, and a dopant imparting n-type or p-type conductivity is added to the region 313a and the region 313b. The region 313a and the region 313b function as a source and drain regions of an n-channel or p-channel transistor. For example, the region 313a and the region 313b are electrically connected to the conductive layer 319a and the conductive layer 319b, respectively, through the connection layers 318.

In the case where the transistor 301 is an n-channel transistor, an element imparting n-type conductivity is used as the dopant. In contrast, in the case where the transistor 301 is a p-channel transistor, an element imparting p-type conductivity is used as the dopant.

Note that low-concentration regions may be in parts of the region 313a and the region 313b. In that case, the low-concentration regions may be shallower than the rest of the region 313a and the region 313b; however, this embodiment is not limited thereto.

The insulating layer 314 is provided over a region of the semiconductor layer 311 that is between the insulating layers 312. The insulating layer 314 functions as a gate insulating layer of the transistor 301.

A layer of a material such as silicon oxide, silicon nitride, silicon oxynitride, silicon nitride oxide, aluminum oxide, aluminum nitride, aluminum oxynitride, aluminum nitride oxide, hafnium oxide, or an organic insulating material (e.g., polyimide or acrylic) can be used as the insulating layer 314, for example. The insulating layer 314 may be formed by stacking materials that can be used for the insulating layer 314.

The conductive layer 315 overlaps with the semiconductor layer 311 with the insulating layer 314 provided therebetween. A region of the semiconductor layer 311 that overlaps with the conductive layer 315 is a channel formation region of the transistor 301. The conductive layer 315 functions as a gate of the transistor 301.

A layer of a metal material such as molybdenum, magnesium, titanium, chromium, tantalum, tungsten, aluminum, copper, neodymium, or scandium or an alloy material containing the metal material as a main component can be used as the conductive layer 315, for example. The conductive layer 315 may be formed by stacking materials that can be used for the conductive layer 315.

The insulating layers 316 are provided over the insulating layer 314 and in contact with a pair of side surfaces of the conductive layer 315 that face each other.

The insulating layer 317 is provided over the conductive layer 315 and the insulating layers 316.

Each of the insulating layers 316 and 317 can be formed using any of the materials that can be used for the insulating layer 314, which may be the same as or different from the material used for the insulating layer 314. Alternatively, the insulating layers 316 or the insulating layer 317 can be formed by stacking materials that can be used for the insulating layers 316 and 317.

The connection layers 318 are provided to fill openings in the insulating layer 317 and are electrically connected to the region 313a and the region 313b.

The conductive layer 319a, the conductive layer 319b, and the conductive layer 319c are provided over the insulating layer 317. The conductive layer 319a is electrically connected to the region 313a through the connection layer 318. The conductive layer 319b is electrically connected to the region 313b through the connection layer 318. The conductive layer 319c is electrically connected to the conductive layer 315 through the connection layer 318 (not illustrated).

Each of the connection layer 318, the conductive layer 319a, the conductive layer 319b, and the conductive layer 319c can be formed using any of the materials that can be used for the conductive layer 315, which may be the same as or different from the material used for the conductive layer 315. Alternatively, each of the connection layer 318, the conductive layer 319a, the conductive layer 319b, and the conductive layer 319c can be formed by stacking materials that can be used for the connection layer 318, the conductive layer 319a, the conductive layer 319b, and the conductive layer 319c.

The insulating layer 320 is provided over the insulating layer 317, the conductive layer 319a, the conductive layer 319b, and the conductive layer 319c. The structure of the insulating layer 320 can be similar to that of the insulating layer 317.

The connection layer 321 is provided to fill an opening in the insulating layer 320 and is electrically connected to the conductive layer 319c. The structure of the connection layer 321 can be similar to that of the connection layer 318.

The semiconductor layer 331 is provided over the insulating layer 320. The semiconductor layer 331 includes a region 332a and a region 332b. The region 332a and the region 332b are regions to which a dopant is added, and function as a source and drain regions. One or more elements selected from a Group 15 element of the periodic table (typically, nitrogen (N), phosphorus (P), arsenic (As), or antimony (Sb)), boron (B), aluminum (Al), argon (Ar), helium (He), neon (Ne), indium (In), fluorine (F), chlorine (Cl), titanium (Ti), or zinc (Zn) can be used as the dopant. Note that the region 332a and the region 332b are not necessarily provided.

Any of the materials described in Embodiment 2 can be used for the semiconductor layer 331.

The insulating layer 333 is provided over the semiconductor layer 331. The insulating layer 333 functions as a gate insulating layer of the transistor 303.

The insulating layer 333 can be formed using, for example, a single layer or a stacked layer using a material selected from aluminum nitride, aluminum oxide, aluminum nitride oxide, aluminum oxynitride, silicon nitride, silicon oxide, silicon nitride oxide, silicon oxynitride, tantalum oxide, or lanthanum oxide.

When a high-k material such as hafnium silicate (HfSiO$_x$), hafnium silicate to which nitrogen is added (HfSi$_x$O$_y$N$_z$), hafnium aluminate to which nitrogen is added (HfAl$_x$O$_y$N$_z$), hafnium oxide, or yttrium oxide is used as the insulating layer 333, gate leakage can be reduced by increasing the physical thickness of a gate insulating film without changing the substantial thickness (e.g., equivalent silicon oxide thickness) of the gate insulating film. Alternatively, it is possible to use a layered structure in which a high-k material and one or more of silicon oxide, silicon oxynitride, silicon nitride, silicon nitride oxide, aluminum oxide, aluminum oxynitride, or gallium oxide are stacked.

The conductive layer 334 overlaps with the semiconductor layer 331 with the insulating layer 333 provided therebetween. The conductive layer 334 functions as a gate of the transistor 303.

The conductive layer 334 can be formed using a metal element selected from aluminum (Al), chromium (Cr), copper (Cu), tantalum (Ta), titanium (Ti), molybdenum (Mo), tungsten (W), neodymium (Nd), or scandium (Sc); an alloy containing the above metal element; an alloy containing the above metal elements in combination; a nitride of the above metal element; or the like. Alternatively, one or more metal elements selected from manganese (Mn), magnesium (Mg), zirconium (Zr), or beryllium (Be) may be used.

In addition, the conductive layer 334 may have a single-layer structure or a layered structure of two or more layers. For example, the conductive layer 334 may have a single-layer structure of aluminum containing silicon, a two-layer structure in which titanium is stacked over aluminum, a two-layer structure in which titanium is stacked over titanium nitride, a two-layer structure in which tungsten is stacked over titanium nitride, a two-layer structure in which tungsten is stacked over tantalum nitride, a two-layer structure in which Cu is stacked over a Cu—Mg—Al alloy, a three-layer structure in which titanium, aluminum, and titanium are stacked in that order, or the like.

Alternatively, for the conductive layer 334, a light-transmitting conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added can be used. Alternatively, the conductive layer 334 can have a layered structure of the light-transmitting conductive material and the above metal element.

Indium gallium zinc oxide containing nitrogen, indium tin oxide containing nitrogen, indium gallium oxide containing nitrogen, indium zinc oxide containing nitrogen, tin oxide containing nitrogen, indium oxide containing nitrogen, or a metal nitride (e.g., InN or ZnN) may overlap with and be in contact with the conductive layer 334 and the semiconductor layer 331.

These materials each have a work function of 5 eV or higher, preferably 5.5 eV or higher. The conductive layer 334 overlaps with the semiconductor layer 331 with the insulating layer 333 provided therebetween, so that the threshold voltage of the transistor can be positive. Accordingly, a so-called normally-off switching element can be obtained. For example, in the case where In—Ga—Zn—O containing nitrogen is used, In—Ga—Zn—O having higher nitrogen concentration than at least the semiconductor layer 331, specifically, In—Ga—Zn—O having a nitrogen concentration of 7 atomic percent or higher is used.

The insulating layers 335 are provided over the insulating layer 333 and in contact with side surfaces of the conductive layer 334. Note that the insulating layers 335 are not necessarily provided.

The conductive layer 336a and the conductive layer 336b are spaced apart from each other and electrically connected to the semiconductor layer 331. The conductive layer 336a is also electrically connected to the connection layer 321 and the region 332a. The conductive layer 336b is also electrically connected to the region 332b.

A material that is similar to the material of the conductive layer 334 can be used for the conductive layer 336a and the conductive layer 336b.

The insulating layer 337 is provided over the conductive layer 336a, the conductive layer 336b, the insulating layers 335, and the conductive layer 334.

A material that is similar to the material of the insulating layer 333 can be used for the insulating layer 337. The insulating layer 337 functions as a protective layer for inhibiting entry of an impurity.

The conductive layer 338 is provided over the conductive layer 336a with the insulating layer 337 provided therebetween.

Here, the storage capacitor 222 is constituted of the conductive layer 336a, the insulating layer 337, and the conductive layer 338.

The insulating layer 339 is provided over the insulating layer 337 and the conductive layer 338.

A material that is similar to the material of the insulating layer 317 can be used for the insulating layer 339.

The connection layer 341a is provided to fill an opening in the insulating layer 339 and is electrically connected to the conductive layer 338. The connection layer 341b is provided to fill an opening in the insulating layer 339 and the insulating layer 337 and is electrically connected to the conductive layer 336b.

The structures of the connection layer 341a and the connection layer 341b can be similar to that of the connection layer 318.

The conductive layer 342a and the conductive layer 342b are provided over the insulating layer 339. The conductive layer 342a is electrically connected to the conductive layer 338 with the connection layer 341a provided therebetween. The conductive layer 342b is electrically connected to the conductive layer 336b with the connection layer 341b provided therebetween.

The structures of the conductive layer 342a and the conductive layer 342b can be similar to those of the conductive layer 319a, the conductive layer 319b, and the conductive layer 319c.

A controller in which the switch 221 and the storage capacitor 222 are stacked over another element (e.g., the transistor 301) included in the controller that is formed in a CMOS process can be formed in this manner.

With such a structure, the switch 221 and the storage capacitor 222 can be directly over another element; thus, a function of holding the potential of voltage data input can be added without an increase in the area occupied by the controller. Further, in the case where a transistor having extremely low off-state leakage current and an oxide semiconductor is used as the switch 221, a voltage control period can be extremely long, and a power supply circuit with high power efficiency can be obtained.

This embodiment can be combined with any of the other embodiments disclosed in this specification as appropriate.

This application is based on Japanese Patent Application serial No. 2012-016769 filed with Japan Patent Office on Jan. 30, 2012, the entire contents of which are hereby incorporated by reference.

What is claimed is:

1. A power supply circuit comprising:
a power converter;
a load;
a first detector comprising a first resistor and a first switch;
a second detector comprising at least a second resistor and a third resistor; and
a controller being electrically connected to the first detector and the second detector,
wherein a first terminal of the load is electrically connected to the power converter and a first terminal of the second resistor,
wherein a second terminal of the load is electrically connected to a first terminal of the first resistor, a first terminal of the first switch, and a first terminal of the third resistor,
wherein a second terminal of the first resistor is electrically connected to a second terminal of the first switch,
wherein a second terminal of the second resistor is electrically connected to a second terminal of the third resistor, and
wherein the controller is configured to generate a signal based on at least one of a potential supplied from the first detector and a potential supplied from the second detector, and supply the signal to the power converter.

2. The power supply circuit according to claim 1, wherein the second terminal of the first resistor and the second terminal of the first switch are grounded.

3. The power supply circuit according to claim 1,
wherein the controller comprises a second switch and a capacitor,
wherein a first terminal of the second switch is electrically connected to the second terminal of the second resistor,
wherein a second terminal of the second switch is electrically connected to a first terminal of the capacitor, and
wherein a second terminal of the capacitor is electrically connected to the first terminal of the third resistor.

4. The power supply circuit according to claim 3,
wherein the second switch comprises a transistor, and
wherein a channel formation region of the transistor comprises an oxide semiconductor layer.

5. The power supply circuit according to claim 1, wherein the controller comprises a first AD converter electrically connected to the first terminal of the first resistor, a second AD converter electrically connected to the second terminal of the second resistor, and a storage device electrically connected to the first AD converter and the second AD converter.

6. The power supply circuit according to claim 1,
wherein the controller is configured to generate the signal based on the potential of the first terminal of the first resistor when the first resistor is not short-circuited and the first switch is OFF state, and
wherein the controller is configured to generate the signal based on the potential of the second terminal of the second resistor when the first resistor is short-circuited and the first switch is ON state.

7. A power supply circuit comprising:
a power converter;
a load;
a first detector comprising a first resistor and a first switch;
a second detector comprising at least a second resistor and a third resistor; and
a controller being electrically connected to the first detector and the second detector,
wherein a first terminal of the load is electrically connected to the power converter and a first terminal of the second resistor,
wherein a second terminal of the load is electrically connected to a first terminal of the first resistor, a first terminal of the first switch, and a first terminal of the third resistor,
wherein a second terminal of the first resistor is electrically connected to a second terminal of the first switch,
wherein a second terminal of the second resistor is electrically connected to a second terminal of the third resistor, and
wherein the controller is configured to generate a signal based on at least one of a potential of the first terminal of the first resistor and a potential of the second terminal of the second resistor, and supply the signal to the power converter.

8. The power supply circuit according to claim 7, wherein the second terminal of the first resistor and the second terminal of the first switch are grounded.

9. The power supply circuit according to claim 7,
wherein the controller comprises a second switch and a capacitor,
wherein a first terminal of the second switch is electrically connected to the second terminal of the second resistor,
wherein a second terminal of the second switch is electrically connected to a first terminal of the capacitor, and
wherein a second terminal of the capacitor is electrically connected to the first terminal of the third resistor.

10. The power supply circuit according to claim 9,
wherein the second switch comprises a transistor, and
wherein a channel formation region of the transistor comprises an oxide semiconductor layer.

11. The power supply circuit according to claim 7, wherein the controller comprises a first AD converter electrically connected to the first terminal of the first resistor, a second AD converter electrically connected to the second terminal of the second resistor, and a storage device electrically connected to the first AD converter and the second AD converter.

12. The power supply circuit according to claim 7,
wherein the controller is configured to generate the signal based on the potential of the first terminal of the first resistor when the first resistor is not short-circuited and the first switch is OFF state, and
wherein the controller is configured to generate the signal based on the potential of the second terminal of the second resistor when the first resistor is short-circuited and the first switch is ON state.

13. A power supply circuit comprising:
a power converter;
a load;
a first detector comprising a first resistor and a first switch;
a second detector comprising at least a second resistor and a third resistor; and
a controller being electrically connected to the first detector and the second detector,
wherein a first terminal of the load is electrically connected to the power converter and a first terminal of the second resistor, wherein a second terminal of the load is electrically connected to a first terminal of the first resistor, a first terminal of the first switch, and a first terminal of the third resistor, wherein a second terminal of the first resistor is electrically connected to a second terminal of the first switch, wherein a second terminal of the second resistor is electrically connected to a second terminal of the third resistor, wherein the controller is configured to generate a signal based on at least one of a potential of the first terminal of the first resistor and a potential of the second terminal of the second resistor, and supply the signal to the power converter, and wherein the load comprises a light-emitting element.

14. The power supply circuit according to claim 13, wherein the second terminal of the first resistor and the second terminal of the first switch are grounded.

15. The power supply circuit according to claim 13, wherein the controller comprises a second switch and a capacitor, wherein a first terminal of the second switch is electrically connected to the second terminal of the second resistor, wherein a second terminal of the second switch is electrically connected to a first terminal of the capacitor, and wherein a second terminal of the capacitor is electrically connected to the first terminal of the third resistor.

16. The power supply circuit according to claim 15, wherein the second switch comprises a transistor, and wherein a channel formation region of the transistor comprises an oxide semiconductor layer.

17. The power supply circuit according to claim 13, wherein the controller comprises a first AD converter electrically connected to the first terminal of the first resistor, a second AD converter electrically connected to the second terminal of the second resistor, and a storage device electrically connected to the first AD converter and the second AD converter.

18. The power supply circuit according to claim 13, wherein the controller is configured to generate the signal based on the potential of the first terminal of the first resistor when the first resistor is not short-circuited and the first switch is OFF state, and wherein the controller is configured to generate the signal based on the potential of the second terminal of the second resistor when the first resistor is short-circuited and the first switch is ON state.

* * * * *